(12) United States Patent
Schrempp et al.

(10) Patent No.: US 8,199,651 B1
(45) Date of Patent: Jun. 12, 2012

(54) METHOD AND SYSTEM FOR MODIFYING COMMUNICATION FLOWS AT A PORT LEVEL

(75) Inventors: James B. Schrempp, Saratoga, CA (US); Erling H. Wold, San Francisco, CA (US)

(73) Assignee: Audible Magic Corporation, Los Gatos, CA (US)

( * ) Notice: Subject to any disclaimer, the term of this patent is extended or adjusted under 35 U.S.C. 154(b) by 248 days.

(21) Appl. No.: 12/405,174

(22) Filed: Mar. 16, 2009

(51) Int. Cl.
  *H04J 1/16* (2006.01)
(52) U.S. Cl. ........ 370/235; 370/230; 370/231; 370/392; 370/401
(58) Field of Classification Search .................. 370/218, 370/392, 401, 230, 231, 235, 475
  See application file for complete search history.

(56) References Cited

U.S. PATENT DOCUMENTS

| | | | |
|---|---|---|---|
| 3,919,479 A | 11/1975 | Moon et al. |
| 4,230,990 A | 10/1980 | Lert, Jr. et al. |
| 4,449,249 A | 5/1984 | Price |
| 4,450,531 A | 5/1984 | Kenyon |
| 4,454,594 A | 6/1984 | Heffron et al. |
| 4,677,455 A | 6/1987 | Okajima |
| 4,677,466 A | 6/1987 | Lert, Jr. et al. |
| 4,739,398 A | 4/1988 | Thomas et al. |
| 4,843,562 A | 6/1989 | Kenyon et al. |
| 4,918,730 A | 4/1990 | Schulze |
| 5,210,820 A | 5/1993 | Kenyon |
| 5,247,688 A | 9/1993 | Ishigami |
| 5,283,819 A | 2/1994 | Glick |
| 5,327,521 A | 7/1994 | Savic et al. |
| 5,437,050 A | 7/1995 | Lamb et al. |
| 5,442,645 A | 8/1995 | Ugon |
| 5,504,518 A | 4/1996 | Ellis |
| 5,581,658 A | 12/1996 | O'Hagan et al. |
| 5,588,119 A | 12/1996 | Vincent |
| 5,612,729 A | 3/1997 | Ellis et al. |

(Continued)

FOREIGN PATENT DOCUMENTS

EP  0349106 A1  1/1990

(Continued)

OTHER PUBLICATIONS

Baum, L., et al., "A Maximization Technique Occurring in the Statistical Analysis of Probabilistic Functions of Markov Chains," *The Annals of Mathematical Statistics*, vol. 41, No. 1, pp. 164-171, 1970.

(Continued)

*Primary Examiner* — Ricky Ngo
*Assistant Examiner* — Dewanda Samuel
(74) *Attorney, Agent, or Firm* — Lowenstein Sandler PC

(57) ABSTRACT

A flow management system for modifying a communication flow from a port at a source IP address to a port at a destination IP address, the modifying being independent of communication flows at other ports at the source IP address and communication flows at other ports at the destination IP address. The system monitors a communication flow between a source port at a source IP address to a destination port at a destination IP address and determines whether a source IP address and destination IP address are participating in a media provider service. The system analyzes the communication flow content and modifies the communication flow from a specific source port to a specific destination port based on the content and whether the source and destination IP addresses are part of a media provider service.

21 Claims, 10 Drawing Sheets

U.S. PATENT DOCUMENTS

| | | |
|---|---|---|
| 5,612,974 A | 3/1997 | Astrachan |
| 5,613,004 A | 3/1997 | Cooperman et al. |
| 5,638,443 A | 6/1997 | Stefik |
| 5,692,213 A | 11/1997 | Goldberg et al. |
| 5,701,452 A | 12/1997 | Siefert |
| 5,710,916 A | 1/1998 | Barbara et al. |
| 5,724,605 A | 3/1998 | Wissner |
| 5,732,193 A | 3/1998 | Aberson |
| 5,850,388 A | 12/1998 | Anderson et al. |
| 5,881,182 A | 3/1999 | Fiete et al. |
| 5,918,223 A | 6/1999 | Blum et al. |
| 5,924,071 A | 7/1999 | Morgan et al. |
| 5,930,369 A | 7/1999 | Cox et al. |
| 5,943,422 A | 8/1999 | Van Wie et al. |
| 5,949,885 A | 9/1999 | Leighton |
| 5,959,659 A | 9/1999 | Dokic |
| 5,983,176 A | 11/1999 | Hoffert et al. |
| 6,006,183 A | 12/1999 | Lai et al. |
| 6,006,256 A | 12/1999 | Zdepski et al. |
| 6,011,758 A | 1/2000 | Dockes et al. |
| 6,026,439 A | 2/2000 | Chowdhury |
| 6,044,402 A | 3/2000 | Jacobson |
| 6,067,369 A | 5/2000 | Kamei |
| 6,088,455 A | 7/2000 | Logan et al. |
| 6,092,040 A | 7/2000 | Voran |
| 6,096,961 A | 8/2000 | Bruti |
| 6,118,450 A | 9/2000 | Proehl et al. |
| 6,192,340 B1 | 2/2001 | Abecassis |
| 6,195,693 B1 | 2/2001 | Berry |
| 6,229,922 B1 | 5/2001 | Sasakawa et al. |
| 6,243,615 B1 | 6/2001 | Neway |
| 6,243,725 B1 | 6/2001 | Hempleman et al. |
| 6,253,193 B1 | 6/2001 | Ginter |
| 6,253,337 B1 | 6/2001 | Maloney et al. |
| 6,279,010 B1 | 8/2001 | Anderson |
| 6,279,124 B1 | 8/2001 | Brouwer et al. |
| 6,285,596 B1 | 9/2001 | Miura et al. |
| 6,330,593 B1 | 12/2001 | Roberts et al. |
| 6,345,256 B1 | 2/2002 | Milsted et al. |
| 6,360,265 B1 * | 3/2002 | Falck et al. .................. 709/227 |
| 6,374,260 B1 | 4/2002 | Hoffert et al. |
| 6,385,596 B1 | 5/2002 | Wiser |
| 6,418,421 B1 | 7/2002 | Hurtado et al. |
| 6,422,061 B1 | 7/2002 | Sunshine |
| 6,438,556 B1 | 8/2002 | Malik et al. |
| 6,449,226 B1 | 9/2002 | Kumagai |
| 6,452,874 B1 | 9/2002 | Otsuka et al. |
| 6,453,252 B1 | 9/2002 | Laroche |
| 6,460,050 B1 | 10/2002 | Pace et al. |
| 6,463,508 B1 | 10/2002 | Wolf et al. |
| 6,477,704 B1 | 11/2002 | Cremia |
| 6,487,641 B1 | 11/2002 | Cusson et al. |
| 6,490,279 B1 | 12/2002 | Chen et al. |
| 6,496,802 B1 | 12/2002 | van Zoest et al. |
| 6,526,411 B1 | 2/2003 | Ward |
| 6,542,869 B1 | 4/2003 | Foote |
| 6,550,001 B1 | 4/2003 | Corwin et al. |
| 6,550,011 B1 | 4/2003 | Sims, III |
| 6,552,254 B2 | 4/2003 | Hasegawa et al. |
| 6,591,245 B1 | 7/2003 | Klug |
| 6,609,093 B1 | 8/2003 | Gopinath et al. |
| 6,609,105 B2 | 8/2003 | Van Zoest et al. |
| 6,628,737 B1 | 9/2003 | Timus |
| 6,636,965 B1 | 10/2003 | Beyda et al. |
| 6,654,757 B1 | 11/2003 | Stern |
| 6,732,180 B1 | 5/2004 | Hale |
| 6,771,316 B1 | 8/2004 | Iggulden |
| 6,771,885 B1 | 8/2004 | Agnihotri et al. |
| 6,834,308 B1 | 12/2004 | Ikezoye |
| 6,947,909 B1 | 9/2005 | Hoke, Jr. |
| 6,968,337 B2 | 11/2005 | Wold |
| 7,043,536 B1 | 5/2006 | Philyaw |
| 7,047,241 B1 | 5/2006 | Erickson |
| 7,058,223 B2 | 6/2006 | Cox et al. |
| 7,181,398 B2 | 2/2007 | Thong et al. |
| 7,266,645 B2 | 9/2007 | Garg et al. |
| 7,269,556 B2 | 9/2007 | Kiss et al. |
| 7,281,272 B1 | 10/2007 | Rubin et al. |
| 7,289,643 B2 | 10/2007 | Brunk et al. |
| 7,349,552 B2 | 3/2008 | Levy et al. |
| 7,363,278 B2 | 4/2008 | Schmelzer et al. |
| 7,426,750 B2 | 9/2008 | Cooper et al. |
| 7,443,797 B2 * | 10/2008 | Cheung et al. ................. 370/236 |
| 7,500,007 B2 | 3/2009 | Ikezoye et al. |
| 7,529,659 B2 | 5/2009 | Wold |
| 7,546,120 B1 * | 6/2009 | Ulvenes ..................... 455/422.1 |
| 7,562,012 B1 | 7/2009 | Wold |
| 7,565,327 B2 | 7/2009 | Schmelzer |
| 7,593,576 B2 | 9/2009 | Meyer et al. |
| 7,701,941 B2 * | 4/2010 | O'Callaghan et al. ........ 370/392 |
| 2001/0013061 A1 | 8/2001 | DeMartin |
| 2001/0027493 A1 * | 10/2001 | Wallace ....................... 709/247 |
| 2001/0027522 A1 | 10/2001 | Saito |
| 2001/0034219 A1 | 10/2001 | Hewitt et al. |
| 2001/0037304 A1 | 11/2001 | Paiz |
| 2001/0041989 A1 | 11/2001 | Vilcauskas et al. |
| 2001/0051996 A1 | 12/2001 | Cooper et al. |
| 2001/0056430 A1 | 12/2001 | Yankowski |
| 2002/0049760 A1 | 4/2002 | Scott |
| 2002/0064149 A1 | 5/2002 | Elliott et al. |
| 2002/0069098 A1 | 6/2002 | Schmidt |
| 2002/0082999 A1 | 6/2002 | Lee |
| 2002/0087885 A1 | 7/2002 | Peled et al. |
| 2002/0120577 A1 | 8/2002 | Hans et al. |
| 2002/0123990 A1 | 9/2002 | Abe et al. |
| 2002/0129140 A1 | 9/2002 | Peled et al. |
| 2002/0133494 A1 | 9/2002 | Goedken |
| 2002/0141384 A1 * | 10/2002 | Liu et al. ....................... 370/352 |
| 2002/0152261 A1 | 10/2002 | Arkin et al. |
| 2002/0152262 A1 | 10/2002 | Arkin et al. |
| 2002/0156737 A1 | 10/2002 | Kahn et al. |
| 2002/0158737 A1 | 10/2002 | Yokoyama |
| 2002/0186887 A1 | 12/2002 | Rhoads |
| 2002/0198789 A1 | 12/2002 | Waldman |
| 2003/0014530 A1 | 1/2003 | Bodin et al. |
| 2003/0018709 A1 | 1/2003 | Schrempp et al. |
| 2003/0023852 A1 | 1/2003 | Wold |
| 2003/0033321 A1 | 2/2003 | Schrempp et al. |
| 2003/0037010 A1 | 2/2003 | Schmelzer |
| 2003/0051100 A1 | 3/2003 | Patel |
| 2003/0061352 A1 | 3/2003 | Bohrer et al. |
| 2003/0061490 A1 | 3/2003 | Abajian |
| 2003/0095660 A1 | 5/2003 | Lee et al. |
| 2003/0135623 A1 | 7/2003 | Schrempp et al. |
| 2003/0191719 A1 | 10/2003 | Ginter et al. |
| 2003/0195852 A1 | 10/2003 | Campbell et al. |
| 2004/0008864 A1 | 1/2004 | Watson et al. |
| 2004/0010495 A1 | 1/2004 | Kramer et al. |
| 2004/0053654 A1 | 3/2004 | Kokumai et al. |
| 2004/0073513 A1 | 4/2004 | Stefik et al. |
| 2004/0089142 A1 | 5/2004 | Georges et al. |
| 2004/0133797 A1 | 7/2004 | Arnold |
| 2004/0148191 A1 | 7/2004 | Hoke, Jr. |
| 2004/0163106 A1 | 8/2004 | Schrempp et al. |
| 2004/0167858 A1 | 8/2004 | Erickson |
| 2004/0201784 A9 | 10/2004 | Dagtas et al. |
| 2005/0021783 A1 | 1/2005 | Ishii |
| 2005/0039000 A1 | 2/2005 | Erickson |
| 2005/0044189 A1 | 2/2005 | Ikezoye et al. |
| 2005/0097059 A1 | 5/2005 | Shuster |
| 2005/0154678 A1 | 7/2005 | Schmelzer |
| 2005/0154680 A1 | 7/2005 | Schmelzer |
| 2005/0154681 A1 | 7/2005 | Schmelzer |
| 2005/0216433 A1 | 9/2005 | Bland et al. |
| 2005/0267945 A1 | 12/2005 | Cohen et al. |
| 2005/0289065 A1 | 12/2005 | Weare |
| 2006/0034177 A1 | 2/2006 | Schrempp |
| 2006/0062426 A1 | 3/2006 | Levy et al. |
| 2007/0074147 A1 | 3/2007 | Wold |
| 2007/0078769 A1 | 4/2007 | Way |
| 2007/0186229 A1 * | 8/2007 | Conklin et al. ................. 725/14 |
| 2008/0008173 A1 | 1/2008 | Kanevsky et al. |
| 2008/0019371 A1 * | 1/2008 | Anschutz et al. ............. 370/394 |
| 2008/0133415 A1 | 6/2008 | Ginter et al. |
| 2008/0141379 A1 | 6/2008 | Schmelzer |
| 2008/0154730 A1 | 6/2008 | Schmelzer |
| 2008/0155116 A1 | 6/2008 | Schmelzer |

| | | | |
|---|---|---|---|
| 2009/0030651 | A1 | 1/2009 | Wold |
| 2009/0031326 | A1 | 1/2009 | Wold |
| 2009/0043870 | A1 | 2/2009 | Ikezoye et al. |
| 2009/0077673 | A1 | 3/2009 | Schmelzer |
| 2009/0089586 | A1 | 4/2009 | Brunk |
| 2009/0131152 | A1* | 5/2009 | Busse ............................ 463/23 |
| 2009/0192640 | A1 | 7/2009 | Wold |
| 2009/0240361 | A1 | 9/2009 | Wold et al. |
| 2009/0328236 | A1 | 12/2009 | Schmelzer |

FOREIGN PATENT DOCUMENTS

| | | |
|---|---|---|
| EP | 0402210 A1 | 6/1990 |
| EP | 0517405 A2 | 5/1992 |
| EP | 0689316 A2 | 12/1995 |
| EP | 0731446 | 9/1996 |
| EP | 0859503 | 8/1998 |
| EP | 0459046 | 4/1999 |
| EP | 1354276 B1 | 12/2007 |
| EP | 1485815 B1 | 10/2009 |
| WO | WO 96/36163 A3 | 11/1996 |
| WO | WO 98/20672 A3 | 5/1998 |
| WO | WO 00/05650 A1 | 2/2000 |
| WO | WO 00/39954 A1 | 7/2000 |
| WO | WO 00/63800 A1 | 10/2000 |
| WO | WO 01/23981 A1 | 4/2001 |
| WO | WO 01/47179 A1 | 6/2001 |
| WO | WO 01/52540 A1 | 7/2001 |
| WO | WO 01/62004 | 8/2001 |
| WO | WO 02/03203 | 1/2002 |
| WO | WO 02/15035 | 2/2002 |
| WO | WO 02/37316 | 5/2002 |
| WO | WO 02/082271 | 10/2002 |
| WO | WO 03/007235 A1 | 1/2003 |
| WO | WO 03/009149 A1 | 1/2003 |
| WO | WO 03/036496 A1 | 5/2003 |
| WO | WO 03/067459 A1 | 8/2003 |
| WO | WO 03/091990 A1 | 11/2003 |
| WO | WO 2004/044820 A1 | 5/2004 |
| WO | WO 2004/070558 | 8/2004 |
| WO | WO 2006/015168 A2 | 2/2006 |
| WO | WO 2009/017710 | 2/2009 |

OTHER PUBLICATIONS

Beritelli, F., et al., "Multilayer Chaotic Encryption for Secure Communications in packet switching Networks," IEEE, vol. 2 Aug. 2000, pp. 1575-1582.
Blum, T., Keislar, D., Wheaton, J., and Wold, E., "Audio Databases with Content-Based Retrieval," Proceedings of the 1995 International Joint Conference on Artificial Intelligence (IJCAI) Workshop on Intelligent Multimedia Information Retrieval, 1995.
Breslin, Pat, et al., Relatable Website, "Emusic uses Relatable's open source audio recognition solution, TRM, to signature its music catabblog for MusicBrainz database," http://www.relatable.com/news/pressrelease/001017.release.html, Oct. 17, 2000.
Business Wire, "Cisco and Fox Host Groundbreaking Screening of Titan A.E.; Animated Epic Will Be First Film Ever to be Digitaly Transmitted Over the Internet Monday," Jun. 5, 2000, 08:14 EDT.
Business Wire, "IBM: IBM Announces New Descrambler Software; First To Offer Software To Work With Digital Video Chips," Jun. 5, 25, 1997, 07:49.
Chen, et al., Yong-Cong, A Secure and Robust Digital Watermaking Technique By the Blcok Cipher RC6 and Secure Hash Algorithm, Deparment of Computer Science, National Tsing Hua University, 2001.
Cosi, P., De Poli, G., Prandoni, P., "Timbre Characterization with Mel-Cepstrum and Neural Nets," Proceedings of the 1994 International Computer Music Conference, pp. 42-45, San Francisco, No date.
Dempster, A.P., et al., "Maximum Likelihood from Incomplete Data via the EM Algorithm" *Journal of the Royal Statistical Society, Series B (Methodological)*, vol. 39, Issue 1, pp. 31-38, 1977.
Feiten, B. and Gunzel, S., "Automatic Indexing of a Sound Database Using Self-Organizing Neural Nets," Computer Music Journal, 18:3, pp. 53-65, Fall 1994.

Fischer, S., Lienhart, R., and Effelsberg, W., "Automatic Recognition of Film Genres," Reihe Informatik, Jun. 1995, Universitat Mannheim, Praktische Informatik IV, L15, 16, D-68131 Mannheim.
Foote, J., "A Similarity Measure for Automatic Audio Classification," Institute of Systems Science, National University of Singapore, 1977, Singapore.
Gasaway Laura, Close of Century Sees New Copyright Amendments, Mar. 200, Information Outlook, 4, 3, 42.
Gonzalez, R. and Melih, K., "Content Based Retrieval of Audio," The Institute for Telecommunication Research, University of Wollongong, Australia, No date.
Haitsma, J., et al., "Robust Audio Hashing for Content Identification", CBMI 2001, Second International Workshop on Content Based Multimedia and Indexing, Brescia, Italy, Sep. 19-21, 2001.
Harris, Lesley Ellen, "To register or not," Mar. 2006, Information Outlook, 10, 3, 32(s).
Kanth, K.V. et al. "Dimensionality Reduction or Similarity Searching in Databases," Computer Vision and Image understanding, vol. 75, Nos. 1/2 Jul./Aug. 1999, pp. 59-72, Academic Press. Santa Barbara, CA, USA.
Keislar, D., Blum, T., Wheaton, J., and Wold, E., "Audio Analysis for Content-Based Retrieval" Proceedings of the 1995 International Computer Music Conference.
Ohtsuki, K., et al., "Topic extraction based on continuous speech recognition in broadcast-news speech," Proceedings IEEE Workshop on Automated Speech Recognition and Understanding, 1997, pp. 527-534, N.Y., N.Y., USA.
Packethound Tech Specs, www.palisdesys.com/products/packethount/tck specs/prodPhtechspecs.shtml, 2002.
"How does PacketHound work?", www.palisdesys.com/products/packethound/how_does_it_work/prod_Pghhow.shtml 2002.
Pankanti, Sharath, "Verification Watermarks on Fingerprint Recognition and Retrieval," Part of IS&T/SPIE Conference on Security and Watermarking of Multimedia Contents, San Jose, CA Jan. 1999, SPIE vol. 3657, pp. 66-78.
Pellom, B. et al., "Fast Likelihood Computation Techniques in Nearest-Neighbor search for Continuous Speech Recognition.", *IEEE Signal Processing Letters*, vol. 8, pp. 221-224 Aug. 2001.
Reynolds, D., et al., "Robust Text-Independent Speaker Identification Using Gaussian Mixture Speaker Models", *IEEE Transactions on Speech and Audio Processing*, vol. 3, No. 1, pp. 72-83 Jan. 1995.
Scheirer, E., Slaney, M., "Construction and Evaluation of a Robust Multifeature Speech/Music Discriminator," pp. 1-4, Proceedings of ICASSP-97, Apr. 2-24, Munich, Germany.
Scheirer, E.D., "Tempo and Beat Analysis of Acoustic Musical Signals," Machine Listening Group, E15-401D MIT Media Laboratory, pp. 1-21, Aug. 8, 1997, Cambridge, MA.
Schneier, Bruce, Applied Cryptography, Protocols, Algorithms and Source Code in C, Chapter 2 Protocol Building Blocks, 1996, pp. 30-31.
Smith, Alan J., "Cache Memories," Computer Surveys, Sep. 1982, University of California, Berkeley, California, vol. 14, No. 3, pp. 1-61.
Vertegaal, R. and Bonis, E., "ISEE: An Intuitive Sound Editing Environment," Computer Music Journal, 18:2, pp. 21-22, Summer 1994.
Wang, Yao, et al., "Multimedia Content Analysis," IEEE Signal Processing Magazine, pp. 12-36, Nov. 2000, IEEE Service Center, Piscataway, N.J., USA.
Wold, Erling, et al., "Content Based Classification, Search and Retrieval of Audio," IEEE Multimedia, vol. 3, No. 3, pp. 27-36, 1996 IEEE Service Center, Piscataway, N.J., USA.
Zawodny, Jeremy, D., "A C Program to Compute CDDB discids on Linus and FreeBSD," [internet] http://jeremy.zawodny.com/c/discid-linux-1.3tar.gz, 1 page, Apr. 14, 2001, retrieved Jul. 17, 2007.
European Patent Application No. 02752347.1, Supplementary European Search Report Dated May 8, 2006, 4 pages.
European Patent Application No. 02756525.8, Supplementary European Search Report Dated Jun. 28, 2006, 4 pages.
European Patent Application No. 02782170, Supplementary European Search Report Dated Feb. 7, 2007, 4 pages.
European Patent Application No. 02725522.3, Supplementary European Search Report Dated May 12, 2006, 2 Pages.

European Patent Application No. 04706547.9 European Search Report Dated Feb. 25, 2010, 3 Pages.
European Patent Application No. 05778109.8 European Search Report Dated Sep. 10, 2010, 7 Pages.
PCT Search Report PCT/US01/50295, International Search Report dated May 14, 2003, 5 Pages.
PCT Search Report PCT/US02/10615, International Search Report dated Aug. 7, 2002, 5 Pages.
PCT Search Report PCT/US02/33186, International Search Report dated Dec. 16, 2002, 6 Pages.
PCT Search Report PCT/US04/02748, International Search Report and Written Opinion dated Aug. 20, 2007, 8 Pages.
PCT Search Report PCT/US05/26887, International Search Report dated May 3, 2006, 3 Pages.
PCT Search Report PCT/US08/09127, International Search Report dated Oct. 30, 2008, 8 Pages.
Audible Magic Office Action for U.S. Appl. No. 09/511,632 mailed Dec. 4, 2002.
Audible Magic Office Action for U.S. Appl. No. 09/511,632 mailed May 13, 2003.
Audible Magic Office Action for U.S. Appl. No. 09/511,632 mailed Aug. 27, 2003.
Audible Magic Office Action for U.S. Appl. No. 09/511,632 mailed Feb. 5, 2004.
Audible Magic Notice of Allowance for U.S. Appl. No. 09/511,632 mailed Aug. 10, 2004.
Audible Magic Notice of Allowance for U.S. Appl. No. 10/955,841 mailed Sep. 25, 2006.
Audible Magic Notice of Allowance for U.S. Appl. No. 10/955,841 mailed Mar. 23, 2007.
Audible Magic Notice of Allowance for U.S. Appl. No. 10/955,841 mailed Sep. 11, 2007.
Audible Magic Notice of Allowance for U.S. Appl. No. 10/955,841 mailed Feb. 25, 2008.
Audible Magic Notice of Allowance for U.S. Appl. No. 12/251,404 mailed May 14, 2010.
Audible Magic Office Action for U.S. Appl. No. 08/897,662 mailed Aug. 13, 1998.
Audible Magic Notice of Allowance for U.S. Appl. No. 08/897,662 mailed Jan. 29, 1999.
Audible Magic Office Action for U.S. Appl. No. 09/706,227 mailed May 5, 2004.
Audible Magic Office Action for U.S. Appl. No. 09/706,227 mailed Nov. 12, 2004.
Audible Magic Office Action for U.S. Appl. No. 09/706,227 mailed May 9, 2005.
Audible Magic Office Action for U.S. Appl. No. 09/706,227 mailed Nov. 1, 2005.
Audible Magic Office Action for U.S. Appl. No. 09/706,227 mailed Jun. 23, 2006.
Audible Magic Office Action for U.S. Appl. No. 09/706,227 mailed Nov. 7, 2006.
Audible Magic Office Action for U.S. Appl. No. 09/706,227 mailed Mar. 29, 2007.
Audible Magic Office Action for U.S. Appl. No. 09/706,227 mailed Sep. 17, 2007.
Audible Magic Office Action for U.S. Appl. No. 09/706,227 mailed May 29, 2008.
Audible Magic Office Action for U.S. Appl. No. 09/706,227 mailed Jan. 9, 2009.
Audible Magic Office Action for U.S. Appl. No. 12/482,313 mailed Feb. 4, 2011.
Audible Magic Office Action for U.S. Appl. No. 10/192,783 mailed Dec. 13, 2004.
Audible Magic Notice of Allowance for U.S. Appl. No. 10/192,783 mailed Jun. 7, 2005.
Audible Magic Office Action for U.S. Appl. No. 11/239,543 mailed Apr. 23, 2008.
Audible Magic Notice of Allowance for U.S. Appl. No. 11/239,543 mailed Nov. 6, 2008.
Audible Magic Notice of Allowance for U.S. Appl. No. 11/239,543 mailed Feb. 25, 2009.
Audible Magic Office Action for U.S. Appl. No. 12/410,445 mailed Aug. 10, 2010.
Audible Magic Notice of Allowance for U.S. Appl. No. 12/410,445 mailed Oct. 20, 2010.
Audible Magic Office Action for U.S. Appl. No. 09/910,680 mailed Nov. 17, 2004.
Audible Magic Office Action for U.S. Appl. No. 09/910,680 mailed May 16, 2005.
Audible Magic Office Action for U.S. Appl. No. 09/910,680 mailed Sep. 29, 2005.
Audible Magic Office Action for U.S. Appl. No. 09/910,680 mailed Jun. 23, 2006.
Audible Magic Office Action for U.S. Appl. No. 09/910,680 mailed Aug. 8, 2006.
Audible Magic Office Action for U.S. Appl. No. 09/910,680 mailed Jan. 25, 2007.
Audible Magic Office Action for U.S. Appl. No. 09/910,680 mailed Dec. 5, 2007.
Audible Magic Office Action for U.S. Appl. No. 09/999,763 mailed Apr. 6, 2005.
Audible Magic Office Action for U.S. Appl. No. 09/999,763 mailed Oct. 6, 2005.
Audible Magic Office Action for U.S. Appl. No. 09/999,763 mailed Apr. 7, 2006.
Audible Magic Office Action for U.S. Appl. No. 09/999,763 mailed Oct. 6, 2006.
Audible Magic Office Action for U.S. Appl. No. 09/999,763 mailed Mar. 7, 2007.
Audible Magic Office Action for U.S. Appl. No. 09/999,763 mailed Aug. 20, 2007.
Audible Magic Office Action for U.S. Appl. No. 09/999,763 mailed Jan. 7, 2008.
Audible Magic Office Action for U.S. Appl. No. 09/999,763 mailed Jun. 27, 2008.
Audible Magic Office Action for U.S. Appl. No. 09/999,763 mailed Dec. 22, 2008.
Audible Magic Office Action for U.S. Appl. No. 09/999,763 mailed Jul. 20, 2009.
Audible Magic Office Action for U.S. Appl. No. 09/999,763 mailed Dec. 21, 2009.
Audible Magic Office Action for U.S. Appl. No. 09/999,763 mailed Jun. 23, 2010.
Audible Magic Notice of Allowance for U.S. Appl. No. 09/999,763 mailed Sep. 16, 2010.
Audible Magic Office Action for U.S. Appl. No. 10/072,238 mailed May 3, 2005.
Audible Magic Office Action for U.S. Appl. No. 10/072,238 mailed Oct. 25, 2005.
Audible Magic Office Action for U.S. Appl. No. 10/072,238 mailed Apr. 25, 2006.
Audible Magic Office Action for U.S. Appl. No. 10/072,238 mailed Sep. 19, 2007.
Audible Magic Office Action for U.S. Appl. No. 10/072,238 mailed Apr. 7, 2008.
Audible Magic Office Action for U.S. Appl. No. 10/072,238 mailed Oct. 1, 2008.
Audible Magic Office Action for U.S. Appl. No. 10/072,238 mailed Jan. 9, 2009.
Audible Magic Office Action for U.S. Appl. No. 10/072,238 mailed Mar. 31, 2009.
Audible Magic Office Action for U.S. Appl. No. 10/072,238 mailed Aug. 6, 2010.
Audible Magic Office Action for U.S. Appl. No. 10/116,710 mailed Dec. 13, 2004.
Audible Magic Office Action for U.S. Appl. No. 10/116,710 mailed Apr. 8, 2005.
Audible Magic Office Action for U.S. Appl. No. 10/116,710 mailed Oct. 7, 2005.
Audible Magic Office Action for U.S. Appl. No. 10/116,710 mailed Apr. 20, 2006.
Audible Magic Office Action for U.S. Appl. No. 10/116,710 mailed Jul. 31, 2006.

Audible Magic Office Action for U.S. Appl. No. 10/116,710 mailed Jan. 16, 2007.
Audible Magic Notice of Allowance for U.S. Appl. No. 10/116,710 mailed Nov. 19, 2007.
Audible Magic Office ACtion for U.S. Appl. No. 12/042,023 mailed Dec. 29, 2008.
Audible Magic Office Action for U.S. Appl. No. 12/042,023 mailed Jun. 25, 2009.
Audible Magic Notice of Allowance for U.S. Appl. No. 12/042,023 mailed Mar. 8, 2010.
Audible Magic Office Action for U.S. Appl. No. 11/048,307 mailed Aug. 22, 2007.
Audible Magic Office Action for U.S. Appl. No. 11/048,307 mailed May 16, 2008.
Audible Magic Notice of Allowance for U.S. Appl. No. 11/048,307 mailed May 29, 2009.
Audible Magic Office Action for U.S. Appl. No. 12/488,504 mailed Nov. 10, 2010.
Audible Magic Office Action for U.S. Appl. No. 11/048,308 mailed Feb. 25, 2008.
Audible Magic Office Action for U.S. Appl. No. 11/048,308 mailed Mar. 5, 2009.
Audible Magic Notice of Allowance for U.S. Appl. No. 11/048,308 mailed Aug. 7, 2009.
Audible Magic Office Action for U.S. Appl. No. 11/048,338 mailed Apr. 18, 2007.
Audible Magic Office Action for U.S. Appl. No. 11/048,338 mailed Oct. 11, 2007.
Audible Magic Office Action for U.S. Appl. No. 11/048,338 mailed Jan. 14, 2008.
Audible Magic Office Action for U.S. Appl. No. 11/048,338 mailed Jul. 9, 2008.
Audible Magic Office Action for U.S. Appl. No. 11/048,338 mailed Jan. 7, 2009.
Audible Magic Office Action for U.S. Appl. No. 11/048,338 mailed Jul. 6, 2009.
Audible Magic Office Action for U.S. Appl. No. 11/048,338 mailed Dec. 28, 2009.
Audible Magic Office Action for U.S. Appl. No. 11/048,338 mailed Jun. 24, 2010.
Audible Magic Office Action for U.S. Appl. No. 12/035,599 mailed Nov. 17, 2008.
Audible Magic Office Action for U.S. Appl. No. 12/035,599 mailed May 29, 2009.
Audible Magic Office Action for U.S. Appl. No. 12/035,599 mailed Nov. 24, 2009.
Audible Magic Office Action for U.S. Appl. No. 12/035,599 mailed Jun. 9, 2010.
Audible Magic Office Action for U.S. Appl. No. 12/035,609 mailed Dec. 29, 2008.
Audible Magic Office Action for U.S. Appl. No. 12/035,609 mailed Jun. 24, 2009.
Audible Magic Notice of Allowance for U.S. Appl. No. 12/035,609 mailed Dec. 11, 2009.
Audible Magic Notice of Allowance for U.S. Appl. No. 12/277,291 mailed May 12, 2010.
Audible Magic Office Action for U.S. Appl. No. 10/356,318 mailed May 24, 2006.
Audible Magic Office Action for U.S. Appl. No. 10/356,318 mailed Nov. 2, 2006.
Audible Magic Office Action for U.S. Appl. No. 10/356,318 mailed Apr. 11, 2007.
Audible Magic Office Action for U.S. Appl. No. 10/356,318 mailed Nov. 1, 2007.
Audible Magic Office Action for U.S. Appl. No. 10/356,318 mailed May 9, 2008.
Audible Magic Office Action for U.S. Appl. No. 10/356,318 mailed Jan. 6, 2009.
Audible Magic Office Action for U.S. Appl. No. 10/356,318 mailed Jun. 15, 2009.
Audible Magic Office Action for U.S. Appl. No. 10/356,318 mailed Jan. 21, 2010.
Audible Magic Office Action for U.S. Appl. No. 10/356,318 mailed Jan. 7, 2011.
Audible Magic Office Action for U.S. Appl. No. 11/191,493 mailed Jul. 17, 2008.
Audible Magic Office Action for U.S. Appl. No. 11/191,493 mailed Jan. 9, 2009.
Audible Magic Office Action for U.S. Appl. No. 11/191,493 mailed Apr. 28, 2009.
Audible Magic Office Action for U.S. Appl. No. 11/191,493 mailed Nov. 19, 2009.
Audible Magic Office Action for U.S. Appl. No. 11/191,493 mailed May 25, 2010.
Audible Magic Office Action for U.S. Appl. No. 11/191,493 mailed Oct. 4, 2010.
Audible Magic Office Action for U.S. Appl. No. 11/829,662 mailed Oct. 8, 2010.
Audible Magic Office Action for U.S. Appl. No. 11/923,491 mailed Nov. 12, 2010.
Audible Magic Corporation, "Audio Identification Technology Provides The Cornerstone for Online Distribution," 2000, http://www.audiblemagic.com/documents/Technology_Summary.pdf.
Audible Magic Notice of Allowance for U.S. Appl. No. 12/482,313 mailed Aug. 23, 2011.
Audible Magic Notice of Allowance for U.S. Appl. No. 12/410,445 mailed Aug. 12, 2011.

* cited by examiner

```
<IPDataRequest>                                              601
    <Info>                                                  ↙
603 ↘   <SystemGUID>unique guid of the flow management system</SystemGUID>
        <Authentication>shared secret</Authentication>
        <PoPRegionId>n</PopRegionId>
    </Info>
    <FullLoad/>
</IPDataRequest>
```

```
<IPDataRequest>                                              631
    <Info>                                                  ↙
633 ↘   <SystemGUID>unique guid of the flow management system</SystemGUID>
        <Authentication>shared secret</Authentication>
        <PoPRegionId>n</PopRegionId>
    </Info>
    <SequenceStart>nnnn</SequenceStart>
</IPDataRequest>            ↖635
```

METHOD AND SYSTEM FOR MODIFYING COMMUNICATION FLOWS AT A PORT LEVEL

TECHNICAL FIELD

Embodiments of the present invention relate to modifying an Internet Protocol (IP) communication over a network and more specifically to modifying a communication flow from a source port to a destination port.

BACKGROUND OF THE INVENTION

A network subscriber can use peer-to-peer (P2P) software for the unauthorized sharing of copyright-protected content (e.g., music) over a P2P network. Typically, Internet Service Providers (ISPs) prevent the unauthorized sharing of copyright-protected material by cutting off the subscriber from the network, essentially assigning the subscriber a bandwidth of zero. Therefore, the network subscriber is not only prevented from transferring copyright-protected material over the P2P network, but the network subscriber is prevented from transferring any material over the network.

In addition, ISPs are beginning to operate as Media Providers (MP) (e.g., a Music Service Provider (MSP)) to permit network subscribers to legally share unlimited music files among one another within an enclosed network, or "walled garden." There are no digital rights management (DRM) restrictions attached to the music files being traded within the MP (e.g., MSP). Therefore, various business rules need to be applied to the content streams (flows) over the network to manage and maintain data transfers within a MP network. For example, MP subscribers are authorized to upload music (i.e., share music) within the MP network. Therefore, content streams of copyright-protected music from a MP subscriber to an ISP subscriber outside of the MP network need to be blocked without disabling the permissible content streams from the same MP subscriber to other MP subscribers within the MP network. The network traffic should be monitored to determine the source of the content, the destination of the content, and the content that is being transferred on a particular network stream. In addition, an appropriate action should be taken on a subscriber's particular network stream to modify (e.g., block the stream) based on the source address, destination address, and content being transferred independent of a subscriber's other network streams.

BRIEF DESCRIPTION OF THE DRAWINGS

The present invention is illustrated by way of example, and not by way of limitation, in the figures of the accompanying drawings and in which:

FIGS. 6A-6D are exemplary formats defining commands for communicating with a service management server in accordance with one embodiment of the invention;

DETAILED DESCRIPTION

Figure 1A:
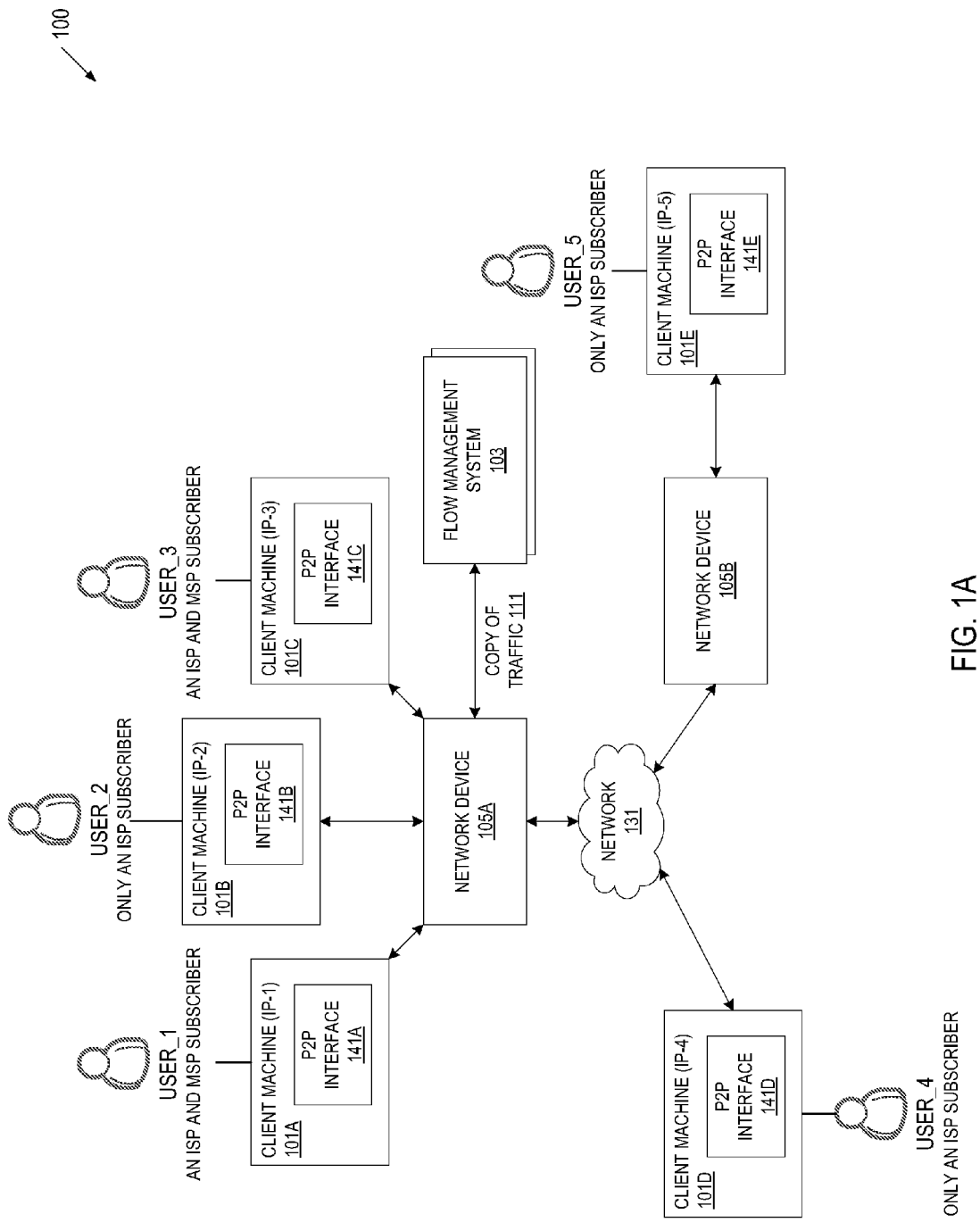
FIG. 1A is an overview block diagram of one embodiment of a flow management system.

Embodiments of the invention provide a method and system for modifying a communication flow over a network from a specific port at a source IP address to a specific port at a destination IP address where the modifying is independent from communication flows at other ports at the source IP address and communication flows at other ports at the destination IP address. A flow management system monitors a communication flow of content being transferred from a source port at a source IP address to a destination port at a destination IP address and determines whether a source IP address and destination IP address are participating in a service of a media provider (MP). Examples of a MP include a Music Service Provider (MSP) and a Video Service Provider (VSP). The flow management system analyzes the content of the communication flow and modifies the communication flow transferring the content from the source port to the destination port based on the analyzed content and the determination of whether the source IP address and the destination IP address are participating in a media provider service. This method and system allows modification of a communication flow from a specific port at a source IP address to a specific port at a destination IP address independent of communication flows at other ports at the source IP address and communication flows at other ports at the destination IP address.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "monitoring," "analyzing," "modifying," "determining," "identifying," "storing," "receiving," "initiating," "sending," "closing," or the like, or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1A is an overview block diagram of one embodiment of the flow management system 100. The system 100 includes any number of client machines 101A-E (IP-1 machine to IP-5 machine), one or more network devices 105A,B, and one or more flow management systems 103. Any number of client machines 101A-E can communicate with each other through a network 131. The network 131 can be a local area network (LAN), such as an intranet within a company, a wide area network (WAN), such as the Internet or similar communication system. The network 131 can include any number of networking and computing devices such as wired and wireless devices. The network 131 can enable a peer-to-peer (P2P) computer network between any number of client machines 101A-E. Client machines 101A-E can be hosted by any type of computing device including desktop computers, laptop computers, handheld computers or similar computing device. The client machines 101A, -E access a P2P network using a P2P interface 141A-E or a specialized application. The network 131 allows User_1, User_2, User_3, User_4 and User_5 to subscribe to services provided by an Internet Service Provider (ISP) and services provided by a Media Provider (e.g., a Music Service Provider). A service provider can provide more than one service. For example, an ISP can also be a MP.

System 100 includes one or more network devices 105A,B for load balancing network traffic and filtering network traffic. A network device can perform load balancing by mirroring network traffic and can be any network device capable of mirroring network traffic. A network device can filter network traffic by controlling traffic on a flow by flow basis and can be any network device capable of controlling traffic on a flow by flow basis. The functionality of load balancing and filtering can be performed by a single network device or separately by separate network devices. For example, a single network device, such as a Cisco® Service Control Engine (SCE) or a Allot® Service Gateway (SG) device, can perform both functions, or separate devices, such as a TopLayer® device can perform the load balancing functionality and an SCE or SG network device, can perform the filtering functionality.

The functionality of load balancing and filtering can also be performed by a single network device. For example, network device 105A can be a single network device such as a deep packet inspection (DPI) system capable of monitoring traffic being sent from User_1, User_2 and User 3 over network 131, mirroring traffic from User_1, User_2 and User 3 to one or more flow management systems 131, and filtering the network traffic of User_1, User_2 and User 3. Deep packet inspection is a form of computer network packet filtering that examines the data and/or header part of a packet as it passes an inspection point, searching for predefined criteria to decide if the packet can pass or if it needs to be routed to a different destination. System 100 illustrates the network device 105A (e.g., a DPI device) can be in-line for relevant communication flows, in that the communication flows from one client machine (e.g., client 101A, client 101B, or client 101C) can pass through the network device 105A to another client machine (e.g., client 101D or client 101E) in such a manner that the network device 105A is capable to restrict or modify a plurality of communication flows. In another example, a network device 105B can monitor traffic being sent from User_5 (client 101E). The network device 105A,B can be hosted by any type of computing device including network computing appliances, desktop computers, laptop computers, handheld computers or similar computing device. System 100 illustrates a network device 105A,B as a network appliance (e.g., a network router, hub, or managed switch) connected directly to network 131 in accordance with one embodiment of the invention. The network device 105A,B can be maintained by a media provider (e.g., MSP), a network operator, or a third party service provider.

System 100 includes one or more flow management systems 103 to monitor, analyze and modify traffic travelling over network 131. A flow management system 103 can be hosted by any type of computing device including network computing appliances, desktop computers, laptop computers, handheld computers or similar computing device. A flow management system 103 can connect directly or indirectly to network 131. System 100 illustrates a flow management system 103 as a network appliance connected indirectly to network 131 via network device 105A in accordance with one embodiment of the invention. In one embodiment, network device 105A is a single network device capable of performing both load balancing and filtering (e.g., a DPI system) and a flow management system 103 obtains a copy of the network from the single network device. In another embodiment, network device 105A is separate network devices, one capable of load balancing (mirroring) and another capable of filtering. In this embodiment, the flow management system 103 can obtain a copy of the network traffic 111 from the network device capable of mirroring traffic. In another embodiment, a flow management system 103 and a network device 105A can be hosted by a single machine. The flow management system 103 can be maintained by a media provider (e.g., MSP), a network operator, or a third party service provider.

Figure 1B:
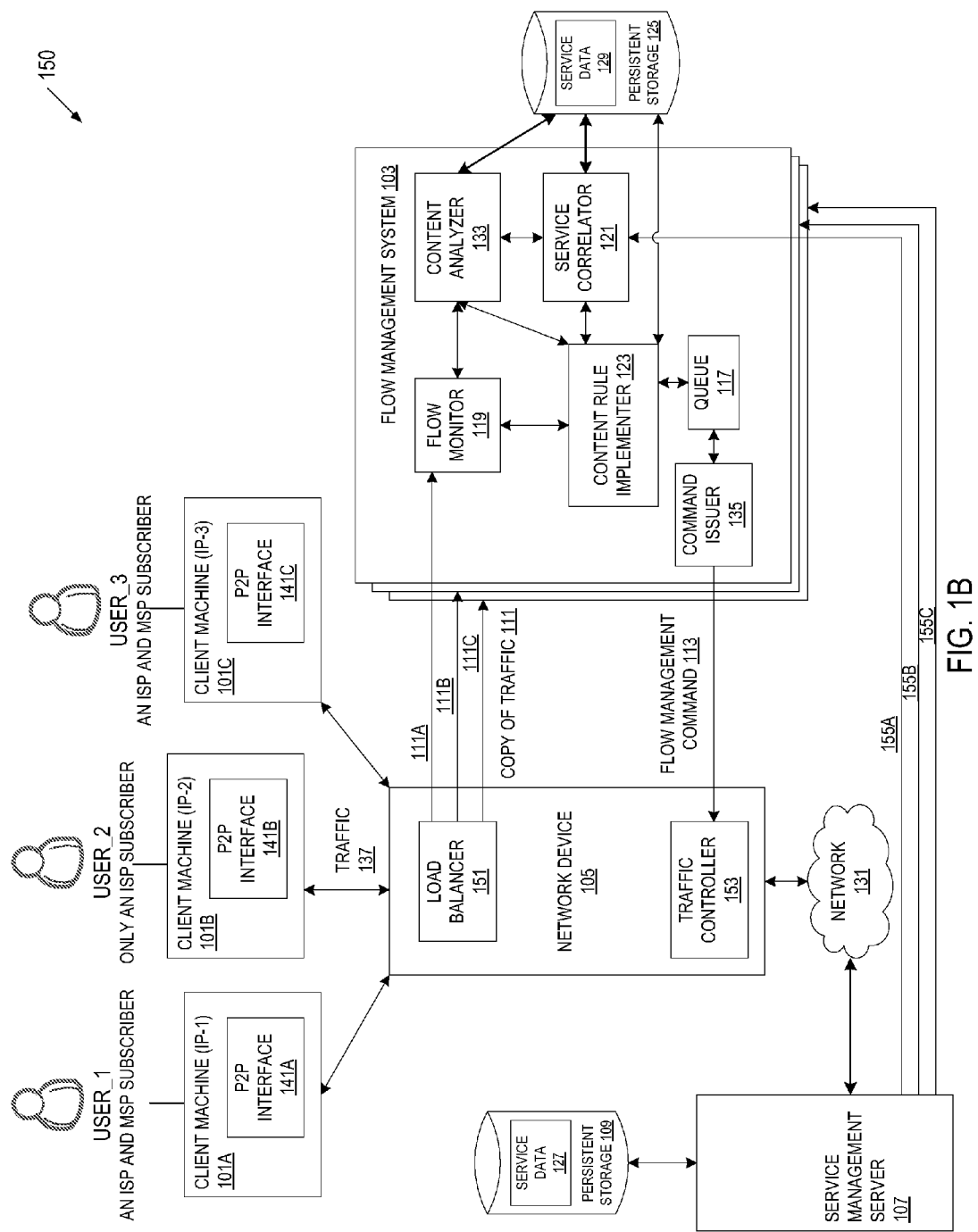
FIG. 1B is a block diagram of another embodiment of a flow management system.

FIG. 1B is a block diagram of one embodiment of the flow management system 100. The system 150 includes any number of client machines 101A-E (IP-1 machine to IP-5 machine), one or more network devices 105, one or more flow management systems 103, a service management server 107, and persistent storage units 109,125 for saving service transaction data 127,129. Any number of client machines 101A-E can communicate with each other through a network 131.

System 150 includes a service management server 107 to maintain service transaction data 127. The service management server 107 can be hosted by any type of computing device including desktop computers, laptop computers, handheld computers or similar computing device. The service management server 107 can be maintained by a media provider (e.g., MSP), a network operator, or a third party service provider. The service management server 107 communicates with various devices (not shown) that assign or maintain IP addresses to subscribers in different parts of the network 131 to maintain a consolidated, up-to-date mapping of certain subscriber groups to current IP addresses on an ISP network. Examples of the various devices include DHCP servers, radius servers, cable modem management servers, etc. For example, the service management server 107 maps IP-1 to User_1, IP-2 to User_2, IP-3 to User_3, IP-4 to User_4 and IP-2 to User_2. In addition, the service management server 107 identifies User_1 as both an ISP subscriber and a MP subscriber, User_3 as both an ISP subscriber and a MP subscriber, and User_2, User_4 and User-5 as only an ISP subscriber. The service management server 107 can further identify User_1 and User_3 as MP Executive Service Level subscribers. The service management server 107 can report on all of the maintained data to interested parties or can report on a portion of the data maintained to interested parties. For instance, the service management server 107 may record all of the data transfers performed over network 131, but may report to a content owner only the details of data transfers involving the content owned by the content owner.

Service transaction data 127 includes a list of IP addresses, the services assigned (e.g., ISP service, MP service) to the IP addresses, and the service levels (e.g., MP Executive Service Level) associated with the IP addresses. Subscribers can be grouped according to the service a subscriber has subscribed to.

In one embodiment, the network device 105 can monitor the network traffic being sent from User_1 (client 101A), User_2 (client 101B), and User_3 (client 101C), over network 131 and provides a copy 111A-C of the communication flows for client machines 101A,101B,101C to one or more flow management systems 103. A network device 105 can communicate with one or more flow management systems 103 and can handle concurrent incoming connections from the one or more flow management systems 103. The network device 105 can have more than one traffic output. For example, the network device 105 may be monitoring 10 Gbps network traffic 137 and may filter peer-to-peer (P2P) traffic of P2P users (e.g., User_1, User_2, User_3). The P2P traffic may be only 3 Gbps. The network device 105 can mirror the filtered traffic 111 to one or more flow management systems 103. The network device 105 can output three outputs of 1 Gbps each (111A, 111B, 111C). In one embodiment, the network device 105 can be a single device including a load balancer 151 to mirror traffic 137 and a traffic controller 153 to filter traffic 137. For example, network device 105 can be a single device such as a DPI system used coupled to several flow management systems 103. In an alternative embodiment, the load balancer 151 and traffic controller 153 can be hosted by separate network devices. For example, load balancer 151 can be a load balancing device, as is known in the art, and can be placed in system 100 to intercept traffic 137 and direct a copy of traffic 111 to one or more flow management systems 103 and traffic controller 153 can be hosted by a separate network device.

In one embodiment, the network device 105 mirrors all network traffic 137 from client 101A,B,C and send the copy 111A-C of all of the traffic 137 to one or more flow management systems 103. In an alternative embodiment the network device 105 can filter the network traffic 137 and sends a copy of traffic of interest 111A-C to the one or more flow management systems 103. The traffic of interest 111A-C can be one or more of P2P traffic, HTTP traffic, FTP traffic, etc.

In particular, a flow management system 103 modifies a communication flow from a specific port at a source IP address to a specific port at a destination IP address where the modifying is independent from communication flows at other ports at the source IP address and communication flows at other ports at the destination IP address. For example, a flow management system 103 can block the unauthorized sharing of a copyright-protected music file in a communication flow between User_1 and User_2, while allowing other legitimate communication flows between User_1 and User_2 (e.g., the sharing of music files that are not copyright-protected). In networking, a transport layer protocol, such as Transmission Control Protocol (TCP) and User Datagram Protocol (UDP), specifies a source and destination port in its packet headers. A specific port is identified by its number commonly known as the port number. A process "binds" to a particular port to send and receive data, meaning that a port will listen for incoming packets whose destination port matches that port number, and/or send outgoing packets whose source port is set to that port number. IP addresses (e.g., IP-1 101A and IP-2 101B) communicating to each other over network 131 have many communication flows between them at the same time. IP addresses can have several TCP connections and several UDP streams, each running on different ports and serving different purposes. A communication flow ("flow") can refer to a communication between two IP addresses on specific ports. In one embodiment, a flow is specified by the vector (IP1, Port1, IP2, Port2), where IP1 is the source IP address, Port1 is the port number of the source port, IP2 is the destination IP address and Port2 is the port number of the destination port.

The flow management system 103 includes a flow monitor 119, a content analyzer 133, a service correlator 121, a content rule implementer 132 and a command issuer 135. This division of functionality is presented by way example for sake of clarity. One skilled in the art would understand that the functionality described could be combined into a monolithic component or sub-divided into any combination of components.

The flow monitor 119 manages the connection with the network device105. The flow monitor 119 initiates the connection and closes the connection with the network device105. When a connection is established, the flow monitor 119 obtains the copy 111 of traffic (one or more communication flows) from the network device 105. For example, the flow monitor 119 obtains a copy 111 of the communication flow of User_1 trading a music file with User_2.

A content analyzer 133 analyzes the communication flow to determine whether a communication flow includes content that can trigger the communication flow to be modified (e.g., block a communication flow, increase the bandwidth of a communication flow). The content analyzer 133 can use business rules stored as service transaction data 129 to analyze the content. Business rules can define the type of content that triggers the modification of a communication flow.

For example, User_1 transfers a copyright-protected music file to User_2. Business rules define that copyright-protected music files can be transferred within a group of MP subscribers, otherwise a particular communication flow transferring the copyright-protected music file is to be blocked. The content analyzer 133 uses the business rules to analyze the copy 111 of the communication flow between User_1 and User_2 and determines that this particular communication flow includes content (e.g., copyright-protected music) that requires the communication flow to be modified (e.g., blocked) if User_1 or User_2 is not an MP subscriber.

In another example, a particular communication flow between two client machines 101A,101C can be modified to increase the bandwidth of the particular communication flow. For example, the business rules can define to increase the bandwidth for any communication flow transferring copyright-protected ™ & © Disney/Pixar files amongst MP service subscribers. User_1 transfers a movie file, Finding Nemo©, a copyright-protected ™ & © Disney/Pixar movie file, to User_3. The content analyzer 133 identifies the content as copyright-protected material and specifically, that the content is ™ & © Disney/Pixar content. The content analyzer 133, using the business rules, determines this particular communication flow includes content (e.g., ™ & © Disney/Pixar movie file) to trigger the modification of the communication flow (e.g., increase the bandwidth of the communication flow).

A service correlator 121 identifies a source IP address (e.g., User_1's address IP-1) and a destination IP address (e.g., User_2's address IP-2) to determine how the content is being transferred (e.g., whether the content is being transferred within the MP network (amongst MP service subscribers)). The service correlator 121 compares the source IP address and destination IP address to service transaction data 129 to determine the services associated with each IP address. The service correlator 121 can determine a subscriber group associated with the source IP address and a subscriber group associated with the destination IP address. For example, the service correlator 121 may determine that User_1's IP address is mapped as a subscriber to the MP service and that User_2's IP address is not mapped as a subscriber to the MP service. The service correlator 121 interfaces with a persistent storage unit 125 that stores service transaction data 129 (e.g., an access control list of IP addresses). The persistent storage unit 125 can be a local storage unit or a remote storage unit. The persistent storage unit 125 can be a magnetic storage unit, optical storage unit, solid state storage unit or similar storage unit. The persistent storage unit 125 can be a monolithic device or a distributed set of devices. A 'set,' as used herein, refers to any positive whole number of items including one.

The service correlator 121 updates service data 129 with the IP addresses obtained from the service management server 107. The service correlator 121 can request service transaction data 127 from a service management server 107 and stores it on the persistent storage unit 125. System 150 illustrates a plurality of flow management systems 103, each including a service correlator 121. Service management server 107 can provide service transaction data 127 to each flow management system as illustrated by connections 155A-C. Although connections 155A-C are illustrated as direct connections, service management server 107 can communicate with each flow management system 103 via network 131. The service correlator 121 can include an ACL (access control list) in order to obtain data from a service management server 107 that is listed in the ACL list. The service management server 107 gathers IP and user group (subscriber group) data mappings from various network devices (e.g., DHCP servers, radius servers, cable modem management servers, etc.) and updates service transaction data 127 (e.g., a master list) of IP addresses mapped to services (e.g., ISP service, MP service) and IP addresses mapped to service levels (e.g., MP Executive Service Level). For example, the service management server 107 can obtain a list of users who are MP subscribers from a provisioning server (not shown) maintained by an ISP. The provisioning server is a system that keeps track of the services each user is entitled to. The service management server 107 can also obtain a list of which IP addresses have been assigned to each user. If an MP subscriber has an IP address, the service management server 107 can keep track of MP subscriber's IP address. Each update, also referred to as a transaction, will either add or delete an IP address according to the services subscribed to. For example, when an ISP subscriber becomes a MP subscriber, an IP address is assigned to the MP subscriber and an 'add' transaction is added to update the master list.

As the service management server 107 applies transactions to the service data 127, it assigns a sequence number to each transaction (e.g., a monotonically increasing sequence number). In one embodiment, the sequence number (transaction number) is implemented as an unsigned 4 byte integer. In one embodiment, the service management server 107 sends transactions to each flow management system 103 in batches and sequence numbers are used between the service management server 107 and a flow management system 103 to assure that no transactions are lost. For example, User_1 and User_3 are MP subscribers. User_2 and User_4 are not MP subscribers. Table 1 illustrates transactions and sequence numbers relating to User_1, User_2, User_3 and User_4 in accordance with one embodiment of the invention.

TABLE 1

| Activity Description | Transaction | Sequence Number |
| --- | --- | --- |
| User_1 is assigned IP address 1.2.3.4 | Add 1.2.3.4 | Seq 105 |
| User_3 is assigned IP address 1.2.3.5 | Add 1.2.3.5 | Seq 106 |
| User_2 is assigned IP address 1.2.3.6 | | |
| User_1 logs out | | |
| IP address 1.2.3.4 is released | | |
| User_4 is assigned IP address 1.2.3.4 | Delete 1.2.3.4 | Seq 107 |
| User_2 logs out | | |
| IP address 1.2.3.6 is released | | |
| User_1 is assigned IP address 1.2.3.6 | Add 1.2.3.6 | Seq 108 |
| User_4 signs up for MP | Add 1.2.3.4 | Seq 109 |

When an ISP subscriber becomes a MP subscriber, an IP address is assigned to the MP subscriber and an 'add' transaction is logged with a sequence number. For example, as seen in Table 1, User_1 is a MP subscriber assigned IP address 1.2.3.4 and the 'add' transaction for IP address 1.2.3.4 is stored with a corresponding sequence number 105. User_2 is an ISP subscriber assigned IP address 1.2.3.6, but is not a MP subscriber, and the IP address assignment to User_2 is not stored as a transaction and is not assigned a sequence number.

If a MP subscriber discontinues the MP service (e.g., a MP subscriber logs out of the MP network), the IP address assigned to the MP subscriber is released. For example, User_1 logs out and the IP address 1.2.3.4 is released. The service management server 107 does not store the release of IP address 1.2.3.4 as a transaction and does not assign the release a sequence number until the released IP address is re-assigned to an ISP subscriber who is not an MP subscriber (e.g., User_4). If the released IP address is assigned to an ISP subscriber who is not an MP subscriber (e.g., User_4), the service management server deletes the IP address of the MP subscriber discontinuing the service. For example, User_4 is assigned IP address 1.2.3.4 and is not a MP subscriber. The 'delete' 1.2.3.4 transaction is stored having a sequence number of 107. However, if the released IP address is re-assigned to an ISP subscriber that is a MP subscriber, the service management server continues to maintain the released IP address as an IP address assigned to a MP subscriber. For example, User_4 signs up as a MP subscriber, and an 'add' 1.2.3.4 transaction is stored having a sequence number of 109.

The service management server 107 has connections with one or more flow management systems 103 and maintains a list of active flow management systems 103. The list can be included as service management data 127. For each active flow management system 103 the service management server 107 stores the sequence number of the last transaction that was sent to the flow management system 103. The service management server 107 interfaces with a persistent storage unit 109 to store the service transaction data 127.

The content rule implementer 123 is responsible for issuing a flow management command 113 to modify a communication flow. The content rule implementer 123 identifies a source port at the source IP address and a destination port at the destination IP address of the communication flow. The content rule implementer 123 can identify a port by a port number. The content rule implementer 123 uses the analyzed content and the services correlated to the source IP address and the destination IP address to determine which flow management command 113 to issue. The content rule implementer 123 can access business rules which can be stored in persistent storage unit 125 to determine which flow management command 113 to implement. In one embodiment, the network device 105 obtains the command 113 and implements the modification. In another embodiment, the content rule implementer 123 sends the command 113 to a queue 117. A command issuer 135 can obtain the command 113 from the queue 117 and send the command 113 to the network device 105. In one embodiment, the network device 105 is a single device hosting a load balancer 151 and a traffic controller 153. In another embodiment, the network device 105 is hosting the load balancer 151 and traffic controller 153 on separate devices and the command issuer 135 can send the command to the network device hosting the traffic controller 153 to modify the specific flow. Examples of flow management commands 113 include a Block Stream command, a Stop Mirroring Stream command, and a Continue Mirroring command.

Modifying (e.g., blocking, increasing bandwidth) a specific communication flow from a source port at a source IP address to a destination port at a destination IP address is independent of the other communication flows at other ports at the source IP address and communication flows at other ports at the destination IP address. For example, blocking a communication flow of User_1 sharing a copyright-protected music file to User_2 does not prevent User_1 from transferring music files that are not copyright-protected material to User_2 or does not prevent User_1 from transferring copyright-protected music files to other MP service subscribers. Therefore, only a particular communication flow between a specific port on one client machine 101A and a specific port on another client machine 101B is modified (e.g., blocked).

Figure 2:
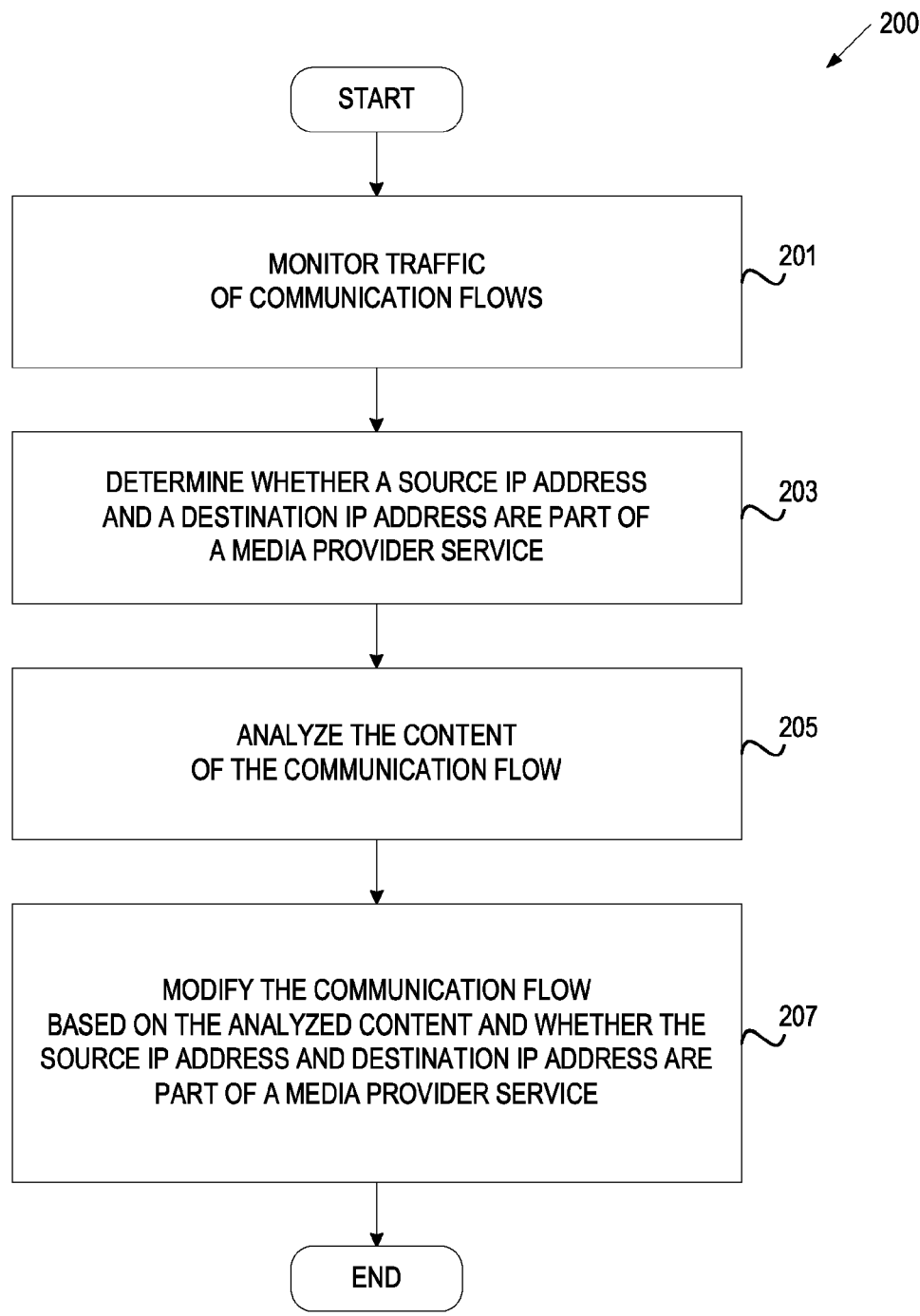
FIG. 2 is a flow diagram of one embodiment of a method for modifying a communication flow from a source port at a source Internet Protocol (IP) address to a destination port at a destination IP address.

FIG. 2 is flow diagram of one embodiment of a method 200 for modifying a communication flow from a source port at a source IP address and a destination port at a destination IP address. The method can be performed by processing logic that may comprise hardware (e.g., circuitry, dedicated logic, etc.), software (such as run on a general purpose computer system or a dedicated machine), or a combination of both. In one embodiment, processing logic resides in a flow management system 103 of FIG. 1.

In one embodiment, this method can be initiated by processing logic monitoring traffic of communication flows (block 201). At block 203, processing logic determines whether a source IP address and a destination IP address are part of a service of a media provider (e.g., whether an IP address is assigned to a subscriber of a MP service). Processing logic identifies a source IP address and a destination IP address of the communication flow and can access service management data to determine which services (e.g., ISP service, MP service) and service levels (e.g., MP Executive Service Level) are associated with the source IP address and the destination IP address. At block 205, processing logic analyzes the content of a communication flow to determine whether the communication flow includes content which may trigger the communication flow to be modified. Processing logic can access service management data (e.g., business rules) to determine which content requires the communication flow to be modified. For example, business rules can define that copyright-protected material in a communication flow may require the communication flow to be blocked. In another example, business rules can define that the bandwidth of communication flows including music files recorded under the Sony BMG™ recording label be increased.

At block 207, processing logic modifies a communication flow based on the analyzed content and the services associated with the IP addresses. Processing logic identifies the source port and destination port of the communication flow to modify. Processing logic can identify a port by port number. Processing logic can send a flow management command to modify a communication flow. For example, if processing logic determines the content of a communication flow is copyright-protected content being transferred to a destination IP address outside the MP network (a destination address not assigned to a MP service subscriber), processing logic sends a Block Stream command to a network device capable of controlling traffic on a flow by flow basis (e.g., a DPI system) to block the communication flow transferring the copyright-protected content from the specific source port at the source IP address to the specific destination port at the destination IP address. The network device then ends the identified communication flow from the specific port at the source IP address to the specific port at the destination IP address.

Figure 3:
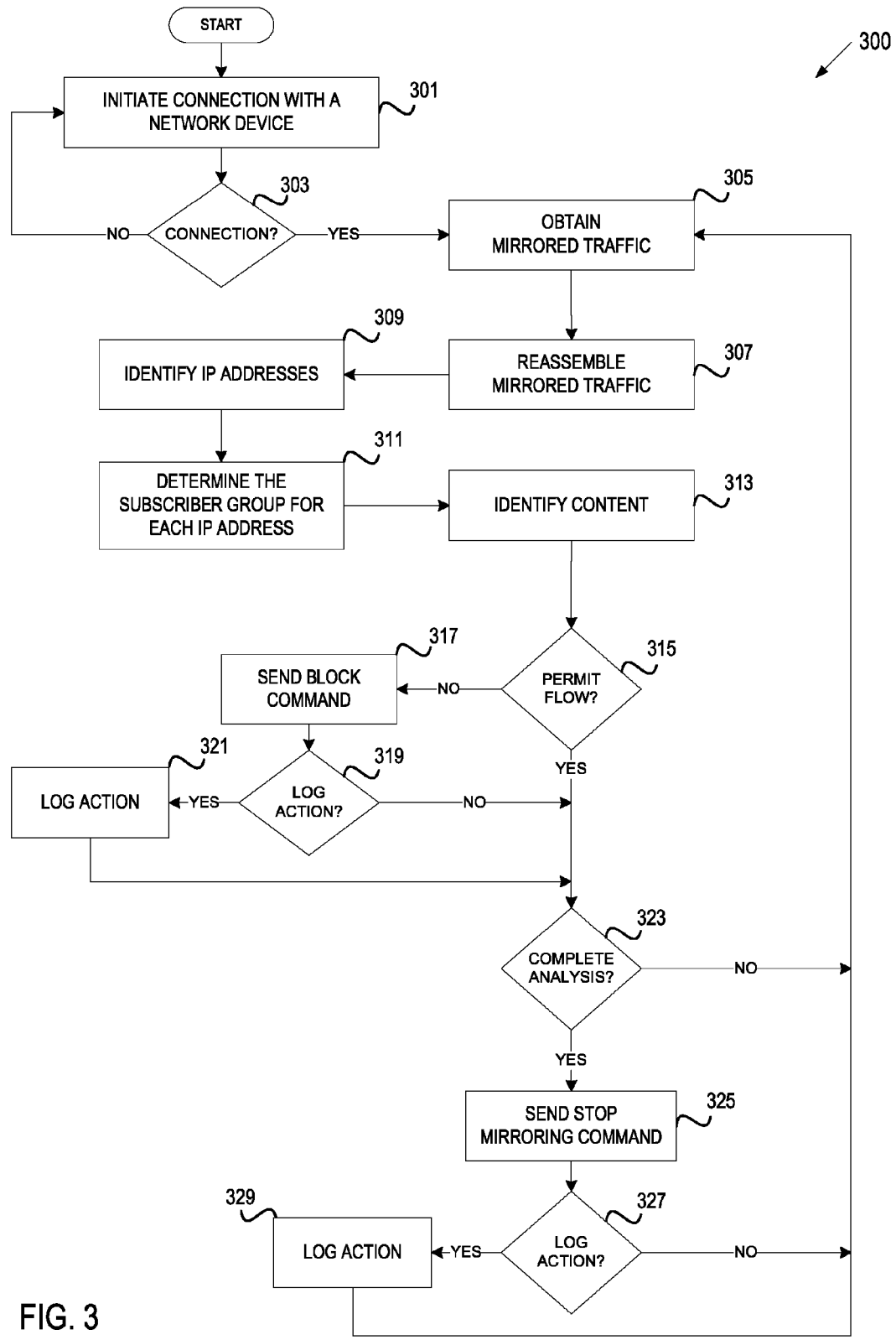
FIG. 3 is a flow diagram of one embodiment of a method for communicating with a network device to modify a communication flow from a source port at a source IP address to a destination port at a destination IP address.

FIG. 3 is a flow diagram of one embodiment of a method 300 for communicating with a network device to modify (e.g., block) a communication flow from a source port at a source IP address to a destination port at a destination IP address. The network device can be a single device capable of load balancing and traffic control (e.g., a DPI system). The network can also be separate network devices having separate load balancing and traffic control functionality. The method 300 can be performed by processing logic that may comprise hardware (e.g., circuitry, dedicated logic, etc.), software (such as run on a general purpose computer system or a dedicated machine), or a combination of both. In one embodiment, processing logic resides in a flow management system 103 of FIG. 1.

In one embodiment, this method can be initiated by processing logic initiating a connection with a network device (block 301). In one embodiment, processing logic opens a Secure Sockets Layer (SSL) TCP connection to a specific port on the network device to initiate communication with the network device.

At block 303, processing logic determines whether a connection with a network device has been established. If a connection with a network device has not been established (block 303), processing logic returns to block 301 to attempt a connection. If a connection with a DPI system has been established (block 303), the TCP connection remains open for the remainder of the communication between the flow management system and the network device. At block 305, processing logic obtains a copy of the traffic from the network device. In one embodiment, the network device mirrors all network traffic to the flow management system. In an alternative embodiment the network device filters the network traffic and sends traffic of interest to the flow management system. The traffic of interest can include one of more of P2P traffic, HTTP traffic, FTP traffic, etc.

At block 307, processing logic reassembles the traffic. For each flow, processing logic extracts and assembles the payload data (e.g., the data and information that identifies the source and destination) from the network traffic. At block 309, processing logic identifies the source IP address and the destination IP address of the communication flow. At block 311, processing logic determines the subscriber group that the source IP address belongs to, if any, and the subscriber group that the destination IP address belongs to, if any. For example, processing logic can compare the source IP address and the destination IP address to a list that maps IP addresses to services (e.g., ISP service, MP service) and maps IP addresses to service levels (e.g., MP Executive Service Level).

At block 313, processing logic identifies the content of the communication flow. For example, processing logic may identify the content of a communication flow is copyright-protected material that is limited to be shared within a MP network. At block 315, processing logic uses the identity of the content, the subscriber group information for the source IP address, and the subscriber group information for the destination IP address to determine whether the communication flow between a specific port at the source IP address and a specific port at the destination IP address is permitted. For example, processing logic may determine that the copyright-protected material is being transferred from a source IP address assigned to a MP subscriber to a destination IP address that is not assigned to a MP subscriber. In such a case, the communication flow between the specific port at the source IP address to the specific port at the destination IP address is not permitted.

Figure 4A:
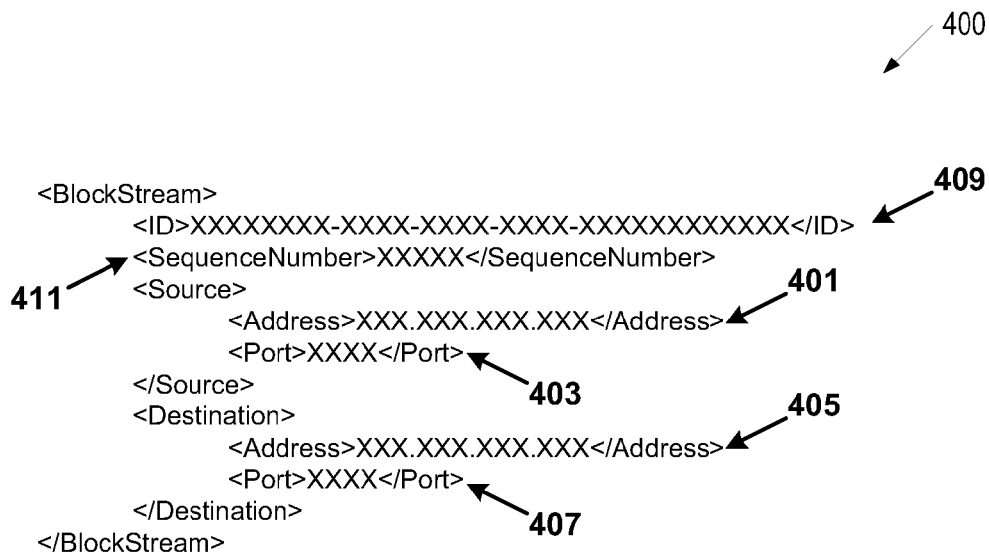
FIGS. 4A and 4B are exemplary formats defining commands for modifying a communication flow from a source port at a source IP address to a destination port at a destination IP address in accordance with one embodiment of the invention.

If the communication flow is permitted (block 315), processing logic determines whether the analysis of a particular communication flow is complete at block 323. If the communication flow is not permitted (block 315), processing logic sends a flow management command to block the communication flow at block 317. Processing logic identifies the source port (e.g., by port number) and destination port of the communication flow to modify (e.g., block). Processing logic can send the flow management command to block the communication flow to a network device to implement. In one embodiment, processing logic sends the block command to a queue before it is sent to the network device. In one embodiment, the network device will end the identified communication flow between the identified ports. In another embodiment, the network device will severely restrict the bandwidth of the identified communication flow between the identified ports. FIG. 4A is an exemplary format defining a Block Stream command 400 to end the identified IP stream from a source port at a source IP address to a destination port at a destination IP address in accordance with one embodiment of the invention. Command 400 includes the source IP address 401, the source port number 403, the destination IP address 405 and the destination port number 407. Command 400 also includes an identification number 409 and a sequence number 411. Each flow management system can have a unique identifier to allow the network device to identify which flow management system is sending a particular communication. The unique identifier can be pre-assigned to a flow management system or can be generated when the flow management system is initialized.

Returning to FIG. 3, at block 319, processing logic determines whether to log the action (e.g., send block command, implement block command). If the action is to be logged (block 319), processing logic logs the action at block 321. The action can be logged in a persistent storage unit (e.g., persistent storage unit 125 in FIG. 1). If the action is not to be logged (319), processing logic determines whether the analysis of a particular communication flow is complete at block 323.

At block 323, for example, processing logic can determine whether the remaining data in the data stream (communication flow) is necessary for further analysis. If the remaining data in the stream is necessary for further analysis (block 323), the analysis of the particular communication flow is not complete and processing logic returns to block 305 to continue receiving the mirrored traffic from the network device. If the remaining data in the stream is not necessary for further analysis (block 323), the analysis of the particular communication flow is complete and processing logic sends a command to the network device to stop mirroring the particular communication flow at block 325.

Figure 4B:
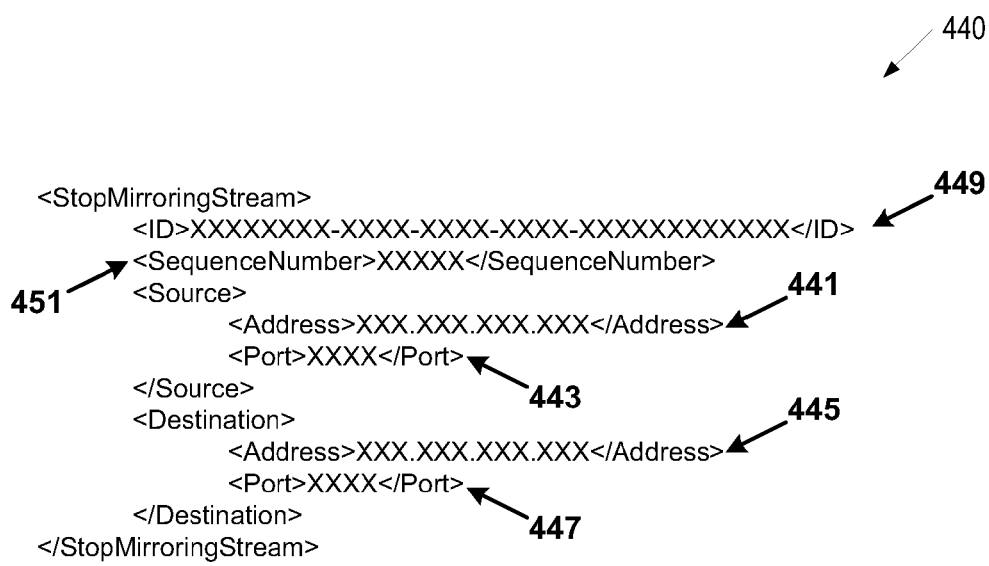

In one embodiment, processing logic sends the stop mirroring command to a queue before it is sent to the network device. FIG. 4B is an exemplary format defining a Stop Mirroring Stream command 440 to stop the mirroring of a communication flow from a source port at a source IP address to a destination port at a destination IP address in accordance with one embodiment of the invention. Command 440 includes the source IP address 441, the source port number 443, the destination IP address 445 and the destination port number 447. Command 450 also includes an identification number 449 and a sequence number 451.

Returning to FIG. 3, at block 327, processing logic determines whether to log the action (e.g., send stop mirroring command, implement stop mirroring command). If the action is to be logged (block 327), processing logic logs the action at block 329. The action can be logged in a persistent storage unit (e.g., persistent storage unit 125 in FIG. 1). If the action is not to be logged (329), processing logic returns to block 305 to continue obtaining mirrored traffic of other communication flows.

Figure 5:
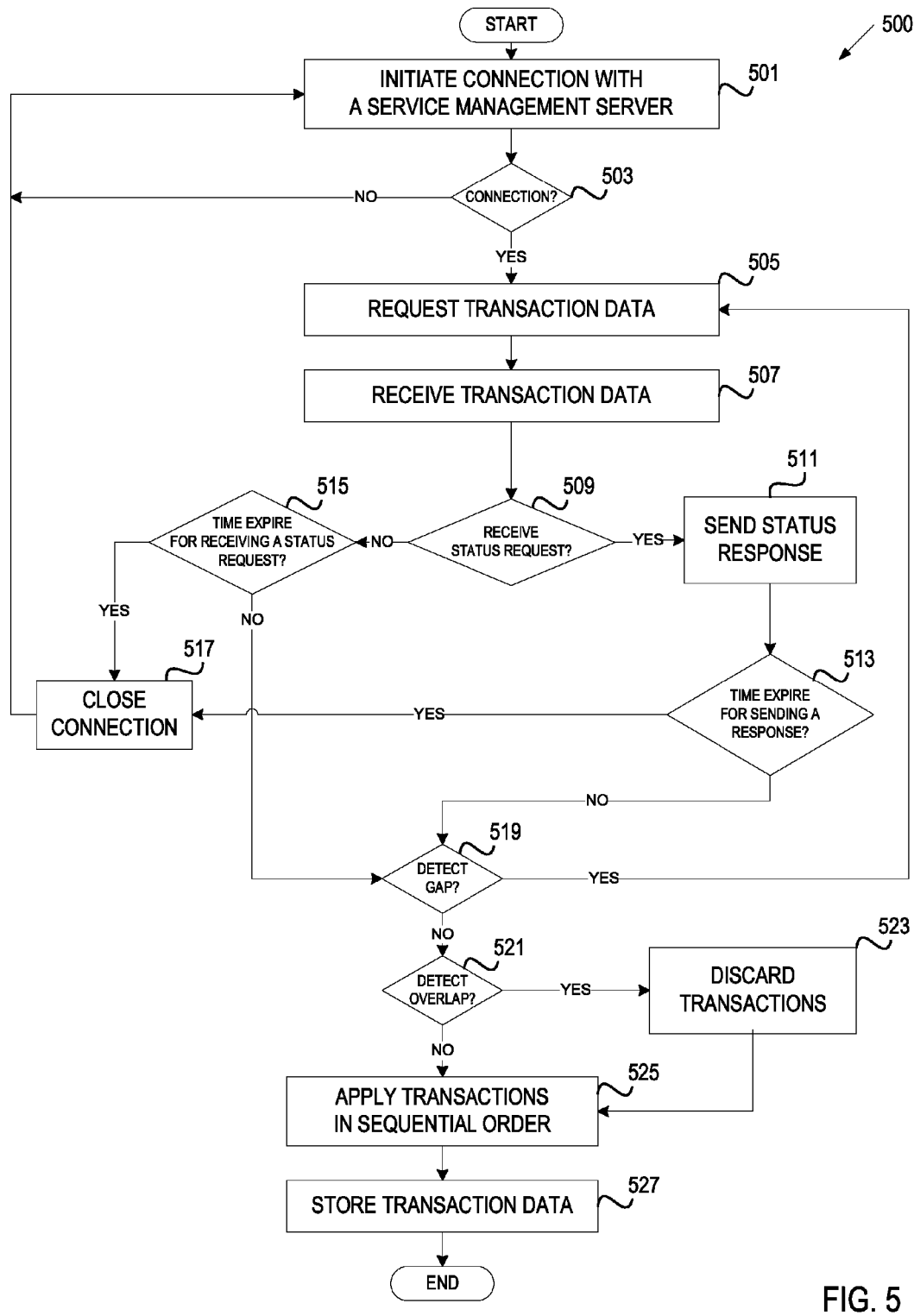
FIG. 5 is a flow diagram of one embodiment of a method for communicating with a service management server to obtain and manage service transaction data.

FIG. 5 is a flow diagram of one embodiment of a method 500 for communicating with a service management server to obtain and manage service transaction data. The method 500 can be performed by processing logic that may comprise hardware (e.g., circuitry, dedicated logic, etc.), software (such as run on a general purpose computer system or a dedicated machine), or a combination of both. In one embodiment, processing logic resides in a flow management system 103 of FIG. 1.

In one embodiment, this method can be initiated by processing logic initiating a connection with a service management server (block 501). In one embodiment, processing logic opens a SSL TCP connection to a well known port on the service management server. A flow management system has a single TCP connection open to the service management server at a time.

At block 503, processing logic determines whether a connection with a service management server has been established. If a connection with the service management server has not been established (block 503), processing logic returns to block 501 to initiate a connection. If a connection with the service management server has been established (block 503), the TCP connection remains open for the remainder of the communication between the flow management system and the service management server.

At block 505, processing logic sends a request for service transaction data. The request can be a full load request or a delta load request. A full load request is a request for a complete list of all service (e.g., MP service) subscriber IP addresses. Processing logic can send a full load request to completely initialize its own MP IP list. In one embodiment, processing logic deletes its own service transaction data in its entirety (e.g., processing logic deletes its entire IP list) prior to sending a full load request. FIG. 6A is an exemplary format defining a full load request 600 in accordance with one embodiment of the invention. A full load request 600 contains information about the flow management system 601 and a shared secret 603 used to authenticate the flow management system to the service management server. Each flow management system can have a unique identifier to allow the network device to identify which flow management system is sending a particular communication. The unique identifier can be pre-assigned to a flow management system or can be generated when the flow management system is initialized.

A delta load request is a request for the transactions with a sequence number greater than the last transaction successfully applied to the flow management system's locally stored service transaction data (e.g., IP address list mapped to services). For example, a flow management system may have lost communication with the service management server and may have established a reconnection. Processing logic sends a delta load request to the service management server including a sequence number that indicates the last transaction that was successfully applied to the flow management system's locally stored service transaction data. FIG. 6B is an exemplary format defining a delta load request 630 in accordance with one embodiment of the invention. A delta load request 630 contains information about the flow management system 631, a shared secret 633 used to authenticate the flow management system to the service management server, and the sequence number 635 of the last successful transaction applied.

Figure 6C:
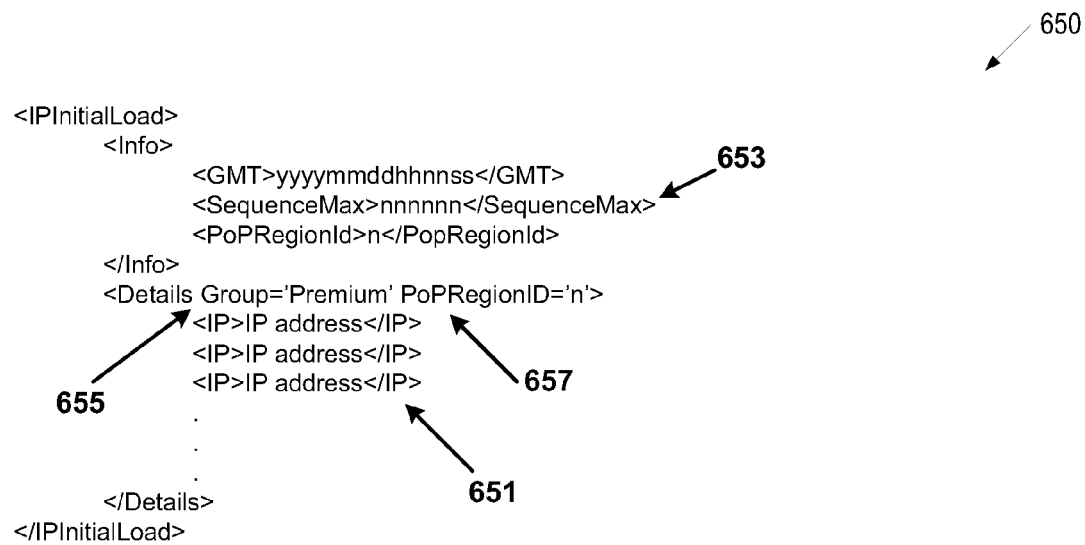

Returning to FIG. 5, at block 507, processing logic obtains service transaction data. Processing logic can obtain the service transaction data from the service management server. In one embodiment, processing logic receives an XML package from the service management server. In another embodiment, processing logic receives a binary package of data from the service management server. Processing logic can receive an Initial Data Load XML package in response to sending a full load request. FIG. 6C is an exemplary format defining an Initial Data Load XML package 650 received in response to a full load request in accordance with one embodiment of the invention. If processing logic sends a full load request at block 505, processing logic may have already deleted its entire IP list. In this case, every IP address 651 in the Initial Data Load XML package 650 is an 'add' transaction. Therefore, no attributes are required in package 650. In addition, a SequenceMax tag 653 indicates the maximum transaction sequence number represented by this package. A group attribute 655 can be specified to indicate a subscriber group (e.g., a MP Executive Service Level). In addition, the point of presence (PoP) 657 for each IP address can be specified.

Figure 6D:
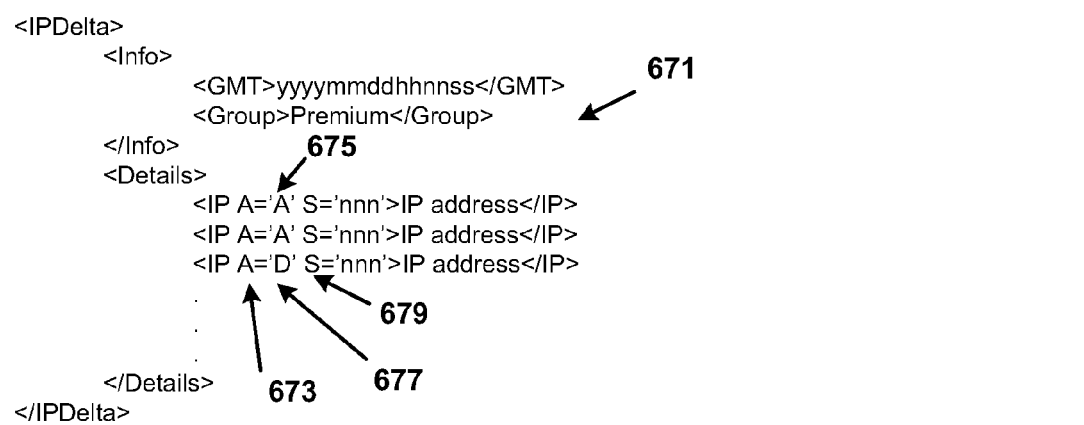

Alternatively, processing logic can receive a Delta Data XML package in response to a delta load request. FIG. 6D is an exemplary format defining a Delta Data XML package 670 received in response to a delta load request in accordance with one embodiment of the invention. The Delta Data XML package 670 contains all of the transactions with a sequence number greater than the sequence number contained in the delta request (e.g., sequence number 635 in Delta Request 630 in FIG. 6B). The Delta Data XML package 670 contains one or more transactions and each transaction contains a sequence number 679. The attribute A (673) represents an action of a transaction, such as 'A' (675) for an 'add' transaction and 'D' (677) for a 'delete' transaction. A group attribute 671 can be specified to indicate a subscriber group (e.g., a MP Executive Service Level).

Returning to FIG. 5, at block 507, in another embodiment, a service management server pushes an update to each flow management system at an interval (e.g., every few seconds) and processing logic automatically obtains service transaction data from the service management server. The service management server periodically reviews its list of active flow management systems to determine whether an entry for an active flow management system has a SequenceLastSent that is less than the current maximum sequence number. If the service management server determines that an entry for an active flow management system has a SequenceLastSent that is less than the current maximum sequence number, the service management server constructs a Delta XML package of all of the transactions with a sequence number greater than SequenceLastSent. The service management server will update the SequenceLastSent for that flow management system in its list of active systems and send the XML to that flow management system.

Figure 7A:
FIG. 7A is an exemplary format defining a status request received from a service management server in accordance with one embodiment of the invention.

At block 509, processing logic determines whether a status request was received. The service management server can have communications open with one or more flow management systems and maintains a list of active flow management systems it is connected to. The service management server sends a status request to each flow management system in its list of active systems at an interval (e.g., every two minutes). In one embodiment, the status request is an XML request. FIG. 7A is an exemplary format defining a status request 700 received from a service management server in accordance with one embodiment of the invention. The status request 700 includes the SequenceLastSent value 701 for that flow management system in the active system list. The SequenceLastSent value 701 is the sequence number of the last transaction that the service management server sent to the particular flow management system.

Figure 7B:
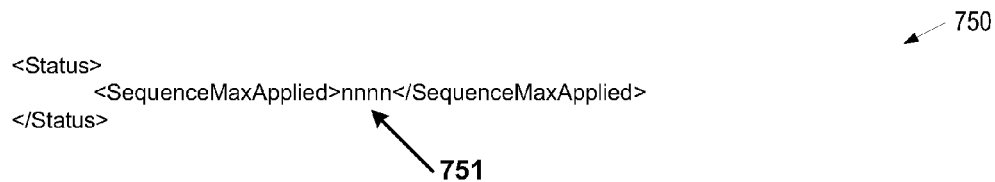
FIG. 7B is an exemplary format defining a status response in accordance with one embodiment of the invention.

Returning to FIG. 5, if a status request is received (block 509), the flow management system completes applying any pending data load XML packages and responds with a status response at block 511. The response can be an XML response. FIG. 7B is an exemplary format defining a status response 750 in accordance with one embodiment of the invention. The status response 750 includes a SequenceMaxApplied value 751 equal to SequenceMax 653 of Initial Data Load XML package 650 of FIG. 6C. The SequenceMaxApplied value 751 is the sequence number of the last transaction that the flow management system successfully applied to its IP address list.

Returning to FIG. 5, at block 513, processing logic determines whether the response to the status request was sent within a predefined time period (e.g., 15 seconds). If the response was sent within the predefined time period (block 513), processing logic continues to block 519 to determine whether there is a gap in the series of sequence numbers. If the response to the status request was not sent within a predefined time period (e.g., 15 seconds) (block 513), the service management server removes the flow management system from its list of active systems and the TCP connection is closed at block 517. Processing logic returns to block 501 to attempt to reconnect to the service management server and to determine at block 503 whether a connection has been established. If a connection has not been established (block 503), processing logic returns to block 501 and continues at an interval (e.g., every five minutes) until a connection is established. If a connection is established (block 503), processing logic requests a Delta Data Load at block 505.

If a status request was not received (block 509), processing logic determines whether a predefined time period (e.g., five minutes) for receiving a status request has expired at block 515. If the predefined time period has expired (block 515), processing logic closes the TCP connection with the service management server at block 517. Processing logic returns to block 501 to attempt to reconnect to the service management server and to determine at block 503 whether a connection has been established. If a connection has not been established (block 503), processing logic returns to block 501 and continues at an interval (e.g., every five minutes) until a connection is established. If a connection is established (block 503), processing logic requests a Delta Data Load at block 505.

If the predefined time period has not expired (block 515), processing logic determines whether there is a gap in the series of sequence numbers at block 519. If processing logic detects a gap in the sequence number series (block 519), processing logic returns to block 505 to send a delta load request to request service transaction data. If processing logic does not detect a gap in the sequence number series (block 519), processing logic determines whether there is an overlap in the sequence number series at block 521.

If the sequence number series have an overlap in numbers (block 521), processing logic discards transactions which have a sequence number less than the sequence number of the last transaction that was successfully added to the flow management system's service transaction data (e.g., IP address list) at block 523. If the series of sequence numbers does not have an overlap in numbers (block 521), processing logic merges transactions into its data store in order of increasing sequence numbers at block 525. At block 527 processing logic stores the transaction data. The data can be stored in a persistent storage unit (e.g., persistent storage unit 125 in FIG. 1).

Figure 8A:
FIG. 8A is an exemplary format defining a flush command in accordance with one embodiment of the invention.

FIG. 8A is an exemplary format defining a Flush IP List command 800 in accordance with one embodiment of the invention. The Flush IP List command 800 allows a service management server to instruct a flow management system to delete its own service transaction data (e.g., MP IP list) and to reinitialize its service transaction data from the service management server's master list. In this case, the service management server sends a Flush IP List XML command 800 to the flow management system. The service management server sets an internal flag in its active system list to note that it will only accept a Full Data Load request from this particular flow management system. The Flush IP List XML command 800 instructs a flow management system to delete its IP address list and to set its own maximum sequence number to 0. The flow management system closes the TCP connection and opens a new connection to the service management server and requests an initial data load from the service management server.

Figure 8B:
FIG. 8B is an exemplary format defining a stop talking command in accordance with one embodiment of the invention.

FIG. 8B is an exemplary format defining a Stop Talking command 850 in accordance with one embodiment of the invention. The Stop Talking command 850 instructs the flow management system to stop attempting a connection with the service management server.

Figure 9:
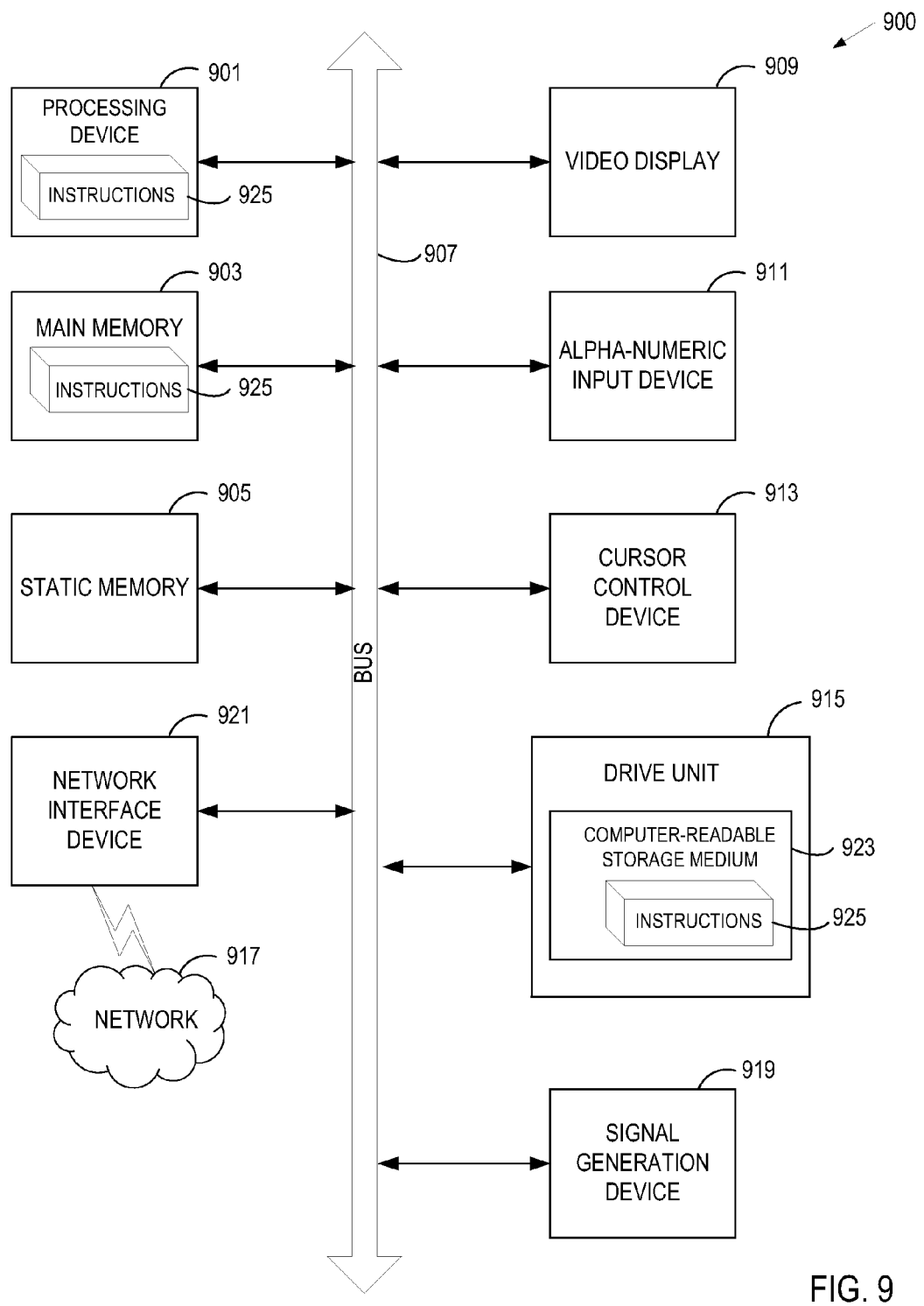
FIG. 9 illustrates an exemplary computer system.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 901, a main memory 903 (e.g., read-only memory (ROM), flash memory, dynamic random access memory (DRAM) such as synchronous DRAM (SDRAM) or Rambus DRAM (RDRAM), etc.), a static memory 905 (e.g., flash memory, static random access memory (SRAM), etc.), and a data storage device 915, which communicate with each other via a bus 907.

Processor 901 represents one or more general-purpose processing devices such as a microprocessor, central processing unit, or the like. More particularly, the processor 901 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 901 may also be one or more special-purpose processing devices such as an application specific integrated circuit (ASIC), a field programmable gate array (FPGA), a digital signal processor (DSP), network processor, or the like. The processor 901 is configured to execute the processing logic 925 for performing the operations and steps discussed herein.

The computer system 900 may further include a network interface device 921. The computer system 900 also may include a video display unit 909 (e.g., a liquid crystal display (LCD) or a cathode ray tube (CRT)), an alphanumeric input device 911 (e.g., a keyboard), a cursor control device 913 (e.g., a mouse), and a signal generation device 919 (e.g., a speaker).

The data storage device 915 may include a machine-accessible storage medium 923 on which is stored one or more sets of instructions (e.g., software 925) embodying any one or more of the methodologies or functions described herein. The software 925 may also reside, completely or at least partially, within the main memory 903 and/or within the processor 901 during execution thereof by the computer system 900, the main memory 903 and the processor 901 also constituting machine-accessible storage media. The software 925 may further be transmitted or received over a network 917 via the network interface device 921.

The machine-accessible storage medium 923 may also be used to store data structure sets that define user identifying states and user preferences that define user profiles. Data structure sets and user profiles may also be stored in other sections of computer system 900, such as static memory 905.

While the machine-accessible storage medium 923 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description.

What is claimed is:

1. A computer-implemented method comprising:
   identifying a source port at a source IP address and a destination port at a destination IP address of a communication flow of content being transferred from the source port to the destination port;
   determining whether at least one of the identified source port or the identified destination port is associated with subscribers of a media provider service; and
   sending a flow management command modifying the communication flow transferring the content from the identified source port to the identified destination port independent from communication flows at other ports at the source IP address and communication flows at other ports at the destination IP address and based on an analysis of the content of the communication flow and the determination of whether at least one of the identified source port or the identified destination port is associated with the subscribers of the media provider service.

2. The computer-implemented method of claim 1, wherein determining whether at least one of the identified source port or the destination port is associated with the subscribers of the media provider service comprises:
   identifying the source IP address and the destination IP address of the communication flow; and
   determining a subscriber group associated with the source IP address and a subscriber group associated with the destination IP address.

3. The computer-implemented method of claim 1, further comprising:
   analyzing the communication flow of content by accessing rules defining content to trigger sending the flow management command modifying the communication flow; and
   determining whether the communication flow of content comprises the content to trigger sending the flow management command modifying the communication flow.

4. The computer-implemented method of claim 1, further comprising:
   analyzing the communication flow of content by determining whether the content is copyright-protected content limited to be transferred amongst the subscribers of the media provider service.

5. The computer-implemented method of claim 1, wherein sending the flow management command modifying the communication flow transferring the content from the identified source port to the identified destination port comprises:
   determining the flow management command based on the analysis of the content of the communication flow, a subscriber group associated with the source IP address, and a subscriber group associated with the destination IP address.

6. The computer-implemented method of claim 1, wherein the flow management command comprises the source IP address, a source port number of the source port, the destination IP address, and a destination port number of the destination port.

7. The computer-implemented method of claim 1, wherein the flow management command is to block the communication flow of content from being transferred from the source port to the destination port.

8. The computer-implemented method of claim 1, further comprising:
   determining whether the analysis of the content of the communication flow is complete; and
   sending the flow management command to stop a network device from providing the communication flow if the analysis is complete.

9. The computer-implemented method of claim 1, wherein identifying the source port at the source IP address and the destination port at the destination IP address of the communication flow of content being transferred from the source port to the destination port comprises:
   initiating a connection with a network device;
   determining whether the connection is established; and
   receiving the communication flow of content being transferred over a network from the network device if the connection is established.

10. The computer-implemented method of claim 9, further comprising:
    re-initiating the connection with a network device at a time interval if the connection is not established.

11. A system comprising:
    a memory;
    a processing device coupled to the memory;
    a content rule implementer executed from the memory by the processing device to identify a source port at a source IP address and a destination port at a destination IP address of a communication flow of content being transferred from the source port to the destination port, to send a flow management command modifying the communication flow transferring the content from the identified source port to the identified destination port independent from communication flows at other ports at the source IP address and communication flows at other ports at the destination IP address and based on an analysis of the content of the communication flow and a determination of whether at least one of the identified source port or the identified destination port is associated with subscribers of a media provider service;
    a service correlator coupled to the content rule implementer and executed from the memory by the processing device to determine whether at least one of the identified source port and or identified destination port is associated with the subscribers of the media provider service;

a content analyzer coupled to the content rule implementer and executed from the memory by the processing device to analyze the content of the communication flow; and a command issuer executed from the memory by the processing device to issue the flow management command modifying the communication flow transferring the content from the identified source port to the identified destination port.

12. The system of claim 11, wherein the service correlator is further to identify the source IP address and the destination IP address of the communication flow and to determine a subscriber group associated with the source IP address and a subscriber group associated with the destination IP address.

13. The system of claim 11, wherein the command rule implementer is further to determine the flow management command modifying the communication flow based on the analysis of the content, a subscriber group associated with the source IP address, and a subscriber group associated with the destination IP address.

14. A non-transitory machine-accessible storage medium that provides instructions that, if executed by a machine, will cause the machine to perform operations, comprising:

identifying, by the machine, a source port at a source IP address and a destination port at a destination IP address of a communication flow of content being transferred from the source port to the destination port;

determining whether at least one of the identified source port or the identified destination port is associated with subscribers of a media provider service; and sending a flow management command modifying the communication flow transferring the content from the identified source port to the identified destination port independent from communication flows at other ports at the source IP address and communication flows at other ports at the destination IP address and based on an analysis of the content of the communication flow and the determination of whether at least one of the identified source port or the identified destination port is associated with the subscribers of the media provider service.

15. The non-transitory machine-accessible storage medium of claim 14, wherein determining whether at least one of the identified source port or the identified destination port is associated with subscribers of the service of the media provider comprises:

identifying the source IP address and the destination IP address of the communication flow; and determining a subscriber group associated with the source IP address and a subscriber group associated with the destination IP address.

16. The non-transitory machine-accessible storage medium of claim 14, further comprising:

analyzing the communication flow of content by accessing rules defining content to trigger sending the flow management command modifying the communication flow; and determining whether the communication flow of content comprises the content to trigger sending the flow management command modifying the communication flow.

17. The non-transitory machine-accessible storage medium of claim 14, wherein sending the flow management command modifying the communication flow transferring the content from the identified source port to the identified destination port comprises:

determining the flow management command based on the analysis of the content of the communication flow, a subscriber group associated with the source IP address, and a subscriber group associated with the destination IP address.

18. The non-transitory machine-accessible storage medium of claim 14, wherein the flow management command comprises the source IP address, a source port number of the source port, the destination IP address, and a destination port number of the destination.

19. The non-transitory machine-accessible storage medium of claim 14, wherein the flow management command is to block the communication flow of content from being transferred from the source port to the destination port.

20. The non-transitory machine-accessible storage medium of claim 14, further comprising:

determining whether the analysis of the content of the communication flow is complete; and sending the flow management command to stop a network device from providing the communication flow if the analysis is complete.

21. The non-transitory machine-accessible storage medium of claim 14, wherein identifying the source port at the source IP address and the destination port at the destination IP address of the communication flow of content being transferred from the source port to the destination port comprises:

initiating a connection with a network device;

determining whether the connection is established; and receiving the communication flow of content being transferred over a network from the network device if the connection is established.

* * * * *